(12) United States Patent
Kugler et al.

(10) Patent No.: US 9,038,324 B2
(45) Date of Patent: May 26, 2015

(54) FIELD PAVER CONNECTOR AND RESTRAINING SYSTEM

(71) Applicant: United Construction Products, Inc., Denver, CO (US)

(72) Inventors: William E. Kugler, Denver, CO (US); Stephen J. Knight, III, Littleton, CO (US)

(73) Assignee: United Construction Products, Inc., Denver, CO (US)

( * ) Notice: Subject to any disclaimer, the term of this patent is extended or adjusted under 35 U.S.C. 154(b) by 41 days.

(21) Appl. No.: 13/777,912

(22) Filed: Feb. 26, 2013

(65) Prior Publication Data
US 2014/0237912 A1  Aug. 28, 2014

(51) Int. Cl.
| E04B 2/00 | (2006.01) |
| E04H 12/00 | (2006.01) |
| E04C 2/52 | (2006.01) |
| E04B 1/00 | (2006.01) |
| E04F 15/22 | (2006.01) |
| E04G 1/22 | (2006.01) |
| E04F 15/024 | (2006.01) |
| H02G 3/38 | (2006.01) |
| E04D 11/00 | (2006.01) |
| E04F 15/02 | (2006.01) |

(52) U.S. Cl.
CPC .......... *E04F 15/02464* (2013.01); *H02G 3/285* (2013.01); *E04D 11/007* (2013.01); *E04D 11/005* (2013.01); *E04F 2015/02061* (2013.01); *E04F 15/02447* (2013.01); *E04F 15/02452* (2013.01); *E04F 15/0247* (2013.01)

(58) Field of Classification Search
CPC ............ E04F 15/02452; E04F 15/0247; E04F 15/02458; E04F 15/02183; E04F 15/02476; E04D 11/007; E04D 11/005; H02G 3/285
USPC ............... 52/434, 653.1, 653.2, 220.2, 169.9, 52/403.1, 126.7, 126.6
See application file for complete search history.

(56) References Cited

U.S. PATENT DOCUMENTS

| 1,436,896 | A | | 11/1922 | Newell |
| 1,614,127 | A | | 2/1927 | Heppes |
| 1,888,937 | A | | 11/1932 | Leon |
| 2,735,523 | A | | 2/1956 | Leyerle |
| 2,896,495 | A | | 7/1959 | Crawford |
| 2,956,652 | A | * | 10/1960 | Liskey, Jr. .................... 52/126.6 |

(Continued)

OTHER PUBLICATIONS

Eternoivica Catalogue Price List, pp. 58-67, dated 2008.

(Continued)

*Primary Examiner* — Phi A
*Assistant Examiner* — Omar Hijaz
(74) *Attorney, Agent, or Firm* — Marsh Fischmann & Breyfogle LLP; Jonathon A. Szumny

(57) ABSTRACT

An elevated building surface assembly including a plurality of surface tiles, a plurality of support pedestals disposed in spaced-apart relation on a fixed surface and having a support plate with a top surface operatively supporting the surface tiles in horizontally spaced-apart relation, and a plurality of elongate restraining members configured to restrict movement of the surface tile(s) in directions away from first and second adjacent support pedestals and/or relative to one or more adjacent surface tiles to advantageously limit movement or displacement of the surface tile(s) that may otherwise occur due to uplift forces (e.g., generated by winds and/or the like).

10 Claims, 17 Drawing Sheets

(56) References Cited

U.S. PATENT DOCUMENTS

| | | | |
|---|---|---|---|
| 2,956,653 A * | 10/1960 | Liskey, Jr. | 52/396.06 |
| 3,150,748 A * | 9/1964 | Liskey, Jr. | 52/396.04 |
| 3,318,057 A * | 5/1967 | Norsworthy | 52/126.6 |
| 3,425,179 A * | 2/1969 | Haroldson | 52/283 |
| 3,606,704 A * | 9/1971 | Denton | 52/167.8 |
| 3,683,438 A | 8/1972 | Tinnerman | |
| 3,775,790 A | 12/1973 | Tinnerman | |
| 3,841,371 A | 10/1974 | Thurston | |
| 4,085,557 A | 4/1978 | Tharp | |
| 4,279,109 A | 7/1981 | Madl | |
| 4,319,520 A * | 3/1982 | Lanting et al. | 454/290 |
| 4,430,837 A | 2/1984 | Kirschenbaum | |
| 4,481,747 A * | 11/1984 | Tengesdal et al. | 52/460 |
| 4,598,510 A * | 7/1986 | Wagner, III | 52/126.6 |
| 4,614,066 A | 9/1986 | Koppenberg | |
| 4,656,795 A * | 4/1987 | Albrecht et al. | 52/126.6 |
| 4,685,258 A * | 8/1987 | Av-Zuk | 52/126.6 |
| 4,922,670 A * | 5/1990 | Naka et al. | 52/126.6 |
| 4,996,804 A | 3/1991 | Naka et al. | |
| 5,072,557 A | 12/1991 | Naka et al. | |
| 5,333,423 A | 8/1994 | Propst | |
| 5,588,264 A | 12/1996 | Buzon | |
| 5,624,200 A | 4/1997 | Beaulieu | |
| 5,791,096 A | 8/1998 | Chen | |
| 5,953,865 A | 9/1999 | Rickards | |
| 5,997,209 A | 12/1999 | Sachs | |
| 6,189,289 B1 | 2/2001 | Quaglia et al. | |
| 6,363,685 B1 | 4/2002 | Kugler | |
| 6,402,415 B1 | 6/2002 | Eberle, III | |
| 6,463,704 B1 | 10/2002 | Jette | |
| 6,550,195 B1 | 4/2003 | Cooper et al. | |
| 6,564,514 B1 | 5/2003 | Rickards | |
| 6,604,330 B2 | 8/2003 | Repasky | |
| 6,851,884 B2 | 2/2005 | Eberle | |
| 6,983,570 B2 | 1/2006 | Mead | |
| 7,140,156 B1 | 11/2006 | Lowe et al. | |
| 7,168,212 B2 | 1/2007 | Jette | |
| 7,360,343 B1 | 4/2008 | Spransy et al. | |
| 7,386,955 B1 | 6/2008 | Repasky | |
| 7,413,371 B2 | 8/2008 | Arnold et al. | |
| 7,647,732 B2 | 1/2010 | Rickards et al. | |
| 7,650,725 B2 | 1/2010 | Mead | |
| 7,770,345 B2 | 8/2010 | McConnell et al. | |
| 7,874,113 B2 | 1/2011 | Eberle, III | |
| 7,908,812 B2 | 3/2011 | Eberle, III | |
| 7,918,059 B2 | 4/2011 | Repasky | |
| 8,555,579 B2 * | 10/2013 | Zlatar | 52/263 |
| 8,667,747 B2 * | 3/2014 | Repasky | 52/126.5 |
| 8,677,703 B2 * | 3/2014 | Meyer | 52/220.1 |
| 8,733,037 B2 * | 5/2014 | Bindschedler et al. | 52/173.3 |
| 8,820,011 B1 * | 9/2014 | Parks | 52/263 |
| 2001/0011441 A1 | 8/2001 | Jette | |
| 2002/0014045 A1 | 2/2002 | Jette | |
| 2002/0078638 A1 * | 6/2002 | Huang | 52/126.6 |
| 2002/0148173 A1 | 10/2002 | Kugler | |
| 2004/0035064 A1 | 2/2004 | Kugler et al. | |
| 2004/0065028 A1 * | 4/2004 | Wu | 52/196 |
| 2004/0261329 A1 | 12/2004 | Kugler et al. | |
| 2005/0066597 A1 | 3/2005 | Chen et al. | |
| 2010/0051763 A1 | 3/2010 | Knight, III et al. | |
| 2010/0281789 A1 | 11/2010 | Vac | |
| 2011/0011012 A1 | 1/2011 | Knight, III et al. | |
| 2011/0016809 A1 | 1/2011 | Knight, III et al. | |
| 2011/0023385 A1 | 2/2011 | Knight, III et al. | |
| 2011/0239550 A1 | 10/2011 | Kugler et al. | |
| 2012/0272588 A1 * | 11/2012 | Kugler et al. | 52/126.6 |
| 2014/0123576 A1 * | 5/2014 | Meyer | 52/126.6 |

OTHER PUBLICATIONS

Brochure entitled Exotic Wood Tile Installation, Bison Deck Supports, a United Construction Products, Inc., Company, dated Jun. 2007.

Ironwoods Elevated Deck Tile Systems with Hanover Pedestals, Website retrieved Jun. 12, 2009.

* cited by examiner

FIELD PAVER CONNECTOR AND RESTRAINING SYSTEM

BACKGROUND OF THE INVENTION

1. Field of the Invention

This invention relates to the field of support structures for supporting and restraining an elevated surface above a fixed surface, such as support structures to elevate surface tiles for elevated floors, decks and walkways.

2. Description of Related Art

Elevated building surfaces such as elevated floors, decks, terraces and walkways are desirable in many environments. One common system for creating such surfaces includes a plurality of surface tiles, such as concrete tiles (e.g., pavers), stone tiles or wood tiles, and a plurality of spaced-apart support pedestals upon which the tiles are placed to be supported above a fixed surface. For example, in outdoor applications, the surface may be elevated above a fixed surface by the support pedestals to promote drainage, to provide a level structural surface for walking, and/or to prevent deterioration of or damage to the surface tiles. The pedestals can have a fixed height, or can have an adjustable height such as to accommodate variations in the contour of the fixed surface upon which the pedestals are placed, or to create desirable architectural features.

Although a variety of shapes are possible, in many applications the surface tiles are generally rectangular in shape, having four corners. In the case of a rectangular shaped tile, each of the spaced-apart support pedestals can support four adjacent surface tiles at the tile corners. Stated another way, each rectangular surface tile can be supported by four pedestals that are disposed under each of the corners of the tile. Large or heavy tiles can be supported by additional pedestals at positions other than at the corners of the tiles.

One example of a support pedestal is disclosed in U.S. Pat. No. 5,588,264 by Buzon, which is incorporated herein by reference in its entirety. The support pedestal disclosed by Buzon can be used in outdoor or indoor environments and is capable of supporting heavy loads applied by many types of building surfaces. The support pedestal generally includes a threaded base member and a threaded support member that is threadably engaged with the base member to enable the height of the support pedestal to be adjusted by rotating the support member or the base member relative to the other. The support pedestal can also include a coupling or coupler member disposed between the base member and the support member for further increasing the height of the pedestal, if necessary. Alternatively, support or coupler members may be in the form of a pipe or box-shaped support that may be cut to length.

Support pedestals are also disclosed in U.S. Pat. No. 6,363,685 by Kugler and U.S. Patent Application Pub. No. 2004/0261329 by Kugler et al., each of which is also incorporated herein by reference in its entirety.

SUMMARY OF THE INVENTION

One problem associated with some support structures for elevated surfaces is that the surface tiles or other members making up the elevated surfaces are sometimes susceptible to movement due to pressure differences above and below the tiles, such as from strong winds blowing across the surface tiles. More specifically, wind can sometimes generate uplift forces, particularly around a perimeter of an elevated building surface, that can dislodge surface tiles and thereby create a possibly dangerous environment requiring subsequent repair. For instance, elevated building surfaces are sometimes built on rooftops or the like, where a parapet often extends upwardly from the elevated surface around the perimeter of the elevated surface. In this case, uplift forces from wind are often greatest near the corners of the elevated building surface (e.g., where adjacent parapet sections meet) and can dislodge surface tiles which may eventually lead to displacement or buckling of other surface tiles. Furthermore, some counties and other jurisdictions have building codes specifying that elevated surface support structures must be able to withstand winds up to, for instance, 100 mph or more.

In view of the foregoing, it is an object of the present invention to provide a support structure or system for an elevated building surface that has improved structural stability compared to existing support structures. Stated differently, it is an object of the present invention to stiffen an elevated building surface assembly to allow the assembly to more readily withstand the effects of uplift forces. In one aspect, a system for supporting and restraining a plurality of surface tiles that are disposed in horizontally spaced-apart relation is disclosed. The system includes a plurality of support pedestals each having a support plate with a top surface for operatively supporting portions of a plurality of surface tiles in horizontally spaced-apart relation, and a plurality of elongate restraining members (e.g., C-shaped channels, H-shaped channels, and/or the like) each having a restraining element and a mounting element spaced apart from the restraining element and operatively attached thereto. The restraining element of each restraining member is configured to be disposed proximate an outer edge segment of at least a first surface tile and along at least a portion of a length of the outer edge segment of the first surface tile (e.g., such as over a top surface of the tile or within an opening in the outer edge segment). The mounting element is configured to be disposed under a bottom surface of the first surface tile that is adjacent the outer edge segment of the first surface tile and affixed to the support plates of at least first and second spaced-apart support pedestals to secure the restraining member to the first and second support pedestals.

In one arrangement, the mounting element of each restraining member may include a plurality of apertures therein, where first apertures of the plurality of apertures are sized and positioned to receive fasteners inserted therein and into the top surfaces of the support plates to secure the restraining members to the support pedestals. For instance, each mounting element may include a first plurality of the first apertures therein adjacent a first end of the restraining members and a second plurality of the first apertures therein adjacent an opposed second end of the restraining members, where the first plurality of the first apertures are sized and positioned to receive a first plurality of the fasteners inserted therein and into the top surfaces of a first of the support plates to secure the restraining members to a first of the support pedestals, where the second plurality of the first apertures are sized and positioned to receive a second plurality of the fasteners inserted therein and into the top surfaces of a second of the support plates to secure the restraining members to a second of the support pedestals, and where the first support pedestal is adjacent the second support pedestal.

In another arrangement, the restraining element may be configured to be disposed proximate a second adjacent surface tile that is adjacent the first surface tile and along a non-abutting outer edge segment of the second adjacent surface tile that is collinear with the outer edge segment of the first surface tile. For instance, the mounting elements may include apertures that are sized and positioned to receive spacers extending from the top surfaces of the support plates, where one of the spacers is configured to space abutting outer edge segments of the first and second surface tiles.

In a further arrangement, the plurality of elongate restraining members may include a plurality of pairs of elongate restraining members, where the first elongate restraining member of each pair is configured to be disposed proximate an outer edge segment of the first surface tile disposed over a support pedestal, and where the second elongate restraining member of each pair is configured to be disposed proximate an abutting outer edge segment of a second surface tile disposed over the support pedestal. For instance, the top surfaces of the support plates may include spacers extending therefrom that are configured to space the first and second elongate restraining members of each pair of elongate restraining members. As another example, the connection elements of the first and second elongate restraining members of each pair may be in an abutting relationship.

In another aspect, an elevated building surface assembly is disclosed including a plurality of surface tiles, a plurality of support pedestals disposed in spaced-apart relation on a fixed surface and having a support plate with a top surface operatively supporting the surface tiles in horizontally spaced-apart relation, and a plurality of elongate restraining members having a restraining element and a mounting element spaced apart from the restraining element and operatively attached thereto. The restraining element is disposed proximate an outer edge segment of at least one of at least a pair of the plurality of surface tiles and along at least a portion of a length of the outer edge segments of at least one of the pair of surface tiles. The mounting element is disposed adjacent the outer edge segments of at least one of the pair of surface tiles and affixed to the support plate of at least a first of the plurality of support pedestals to secure the at least one of the pair of surface tiles to the first support pedestal.

The mounting elements may be secured to the support pedestals in various manners. In one arrangement, the mounting element includes first apertures that receive fasteners inserted therein and into the top surface of the support plate of the first support pedestal to secure the restraining member to the first support pedestal and second apertures that receive spacers extending from the top surface of the support plate of the first support pedestal for spacing abutting outer edge segments of the pair of surface tiles. In another arrangement, the elevated building surface assembly includes adhesive disposed between the mounting element and the top surface of the support plate of the first support pedestal to secure the restraining member to the support pedestals. In a further arrangement, the elevated building surface assembly includes at least one weld joint disposed between the mounting element and the top surface of the support plate of the first support pedestal to secure the restraining member to the support pedestals. In an even further arrangement, the elevated building surface assembly includes at least one spring-loaded locking member disposed between the mounting element and the top surface of the support plate of the first support pedestal to secure the restraining member to the support pedestals.

In one embodiment, the pair of surface tiles includes a first pair of surface tiles, where the restraining element of a first of the plurality of elongate restraining members is disposed proximate an outer edge segment of each of the first pair of surface tiles and along at least a portion of the length of the outer edge segments of the first pair of surface tiles, where the mounting element of the first elongate restraining member is disposed adjacent the outer edge segments of the first pair of surface tiles and is affixed to the support plate of the first support pedestal to secure at least the first pair of surface tiles to the first support pedestal, where the restraining element of a second of the plurality of elongate restraining members is disposed proximate an outer edge segment of each of a second pair of the plurality of surface tiles and along at least a portion of the length of the outer edge segments of the second pair of surface tiles, and where the mounting element of the second elongate restraining member is disposed adjacent the outer edge segments of the second pair of surface tiles and is affixed to the support plate of one of the support pedestals to secure at least the second pair of surface tiles to the one of the support pedestals.

In another embodiment, at least a portion of the plurality of support pedestals may be disposed in a substantially linear row beneath collinear outer edge segments of a plurality of pairs of adjacent surface tiles, where at least a first of the plurality of elongate restraining members is disposed along the linear row of support pedestals. For instance, a second of the plurality of elongate restraining members may be disposed along the linear row of support pedestals.

In a further embodiment, the top surfaces of the plurality of surface tiles may collectively make up an elevated building surface including an outer periphery, where the plurality of elongate restraining members include at least interior restraining members and peripheral restraining members, and where a plurality of the peripheral restraining members are disposed along at least a portion of the outer periphery of the elevated building surface. In one variation, the peripheral restraining members may abut a parapet that at least partially surrounds the outer periphery of the elevated building surface. For instance, some of the peripheral restraining members may be securable to the parapet (e.g., may be secured to and/or may float relative to the parapet).

In a further aspect, a method for the construction of an elevated building surface assembly includes locating a plurality of support pedestals upon a fixed surface with a predetermined spacing between the support pedestals, disposing restraining members over top surfaces of a first portion of the plurality of support pedestals, introducing at least portions of first outer edge segments of a first portion of a plurality of surface tiles between restraining and mounting elements of the restraining members, and placing second outer edge segments of the first portion of surface tiles over top surfaces of a second portion of the plurality of support pedestals.

In one arrangement, the disposing step may include first securing a first plurality of the mounting elements adjacent a first end of the restraining members to the top surfaces of first support pedestals of the first portion of the plurality of support pedestals, and second securing a second plurality of the mounting elements adjacent an opposing second end of the restraining members to the top surfaces of second support pedestals of the first portion of the plurality of support pedestals, where each of the first support pedestals is adjacent one of the second support pedestals. For instance, the first ends of a first plurality of the restraining members and the second ends of a second plurality of the restraining members may be secured over common ones of the first portion of the plurality of support pedestals.

In another arrangement, the method may include positioning at least some of the restraining members adjacent a parapet that at least partially surrounds the plurality of support pedestals. For instance the restraining members may be mechanically affixed in any appropriate manner to the parapet. In a further arrangement, the method may include placing outer edge segments of a second portion of surface tiles over the top surfaces of the second portion of support pedestals to create an elevated building surface. For instance, a method may include first removing, from the elevated building, one of the second portion of surface tiles from the top surfaces of the second portion of support pedestals; and second removing, after the first removing step, one of the first portion of surface tiles from the top surfaces of one or more of the second portion of support pedestals and from the restraining member of one or more of the first portion of support pedestals. The second removing step may include lifting the second outer edge segment of the one of the first portion of surface tiles from the top surfaces of one or more of the second portion of support pedestals and sliding the first outer edge segment of the one of the first portion of surface tiles out from between the restraining and mounting elements of the restraining member of the one or more of the first portion of support pedestals.

DESCRIPTION OF THE INVENTION

Figure 1:
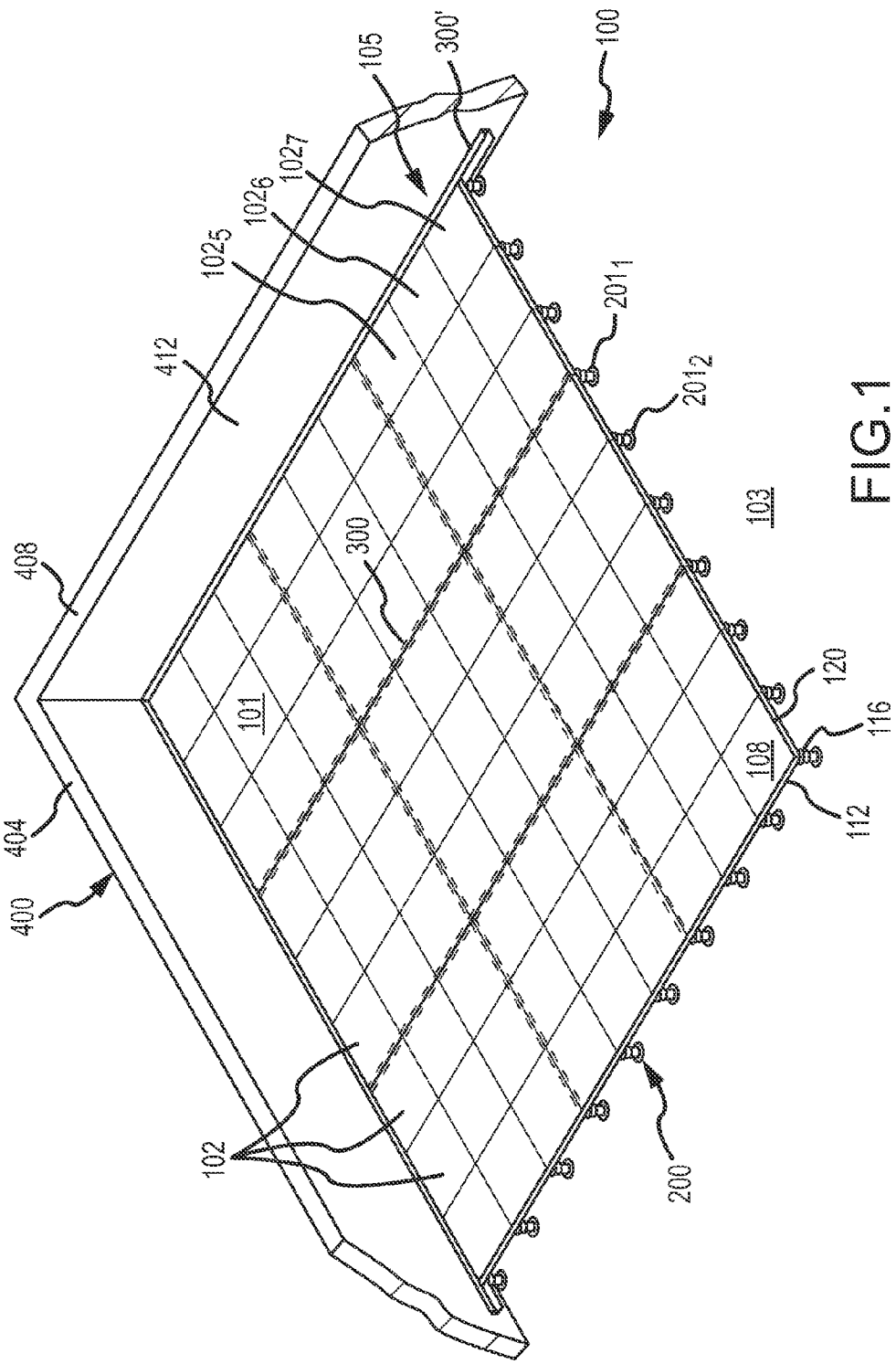
FIG. 1 is an isometric view of an elevated building surface assembly according to an embodiment.

FIG. 1 illustrates a portion of an elevated building surface assembly 100 according to one embodiment that includes an elevated building surface 101 formed from a plurality of building surface components such as surface tiles 102 that are elevated above a fixed surface 103 by a support structure 200. Each surface tile 102 may broadly include generally opposing top and bottom surfaces 108, 112, one or more corner portions 116, and one or more outer edge segments 120 disposed between adjacent corner portions 116. The support structure 200 includes a plurality of spaced-apart support pedestals 201 (e.g., in any appropriate configuration, such as a plurality of rows and columns of support pedestals 201) supporting the surface tiles 102 and a plurality of elongate restraining members 300, 300' (e.g., surface tile connectors), the restraining members 300 being shown in phantom lines in FIG. 1.

As will be discussed in more detail herein, each restraining member 300, 300' is configured to be positioned proximate and along at least a portion of a length of one or more outer edge segments 120 of at least some of the surface tiles 102 to restrict movement of the surface tile(s) 102 in a direction away from the support pedestals 201 and/or relative to one or more adjacent surface tiles 102 to advantageously limit movement or displacement of the surface tile(s) 102 that may otherwise occur due to forces generated by winds and/or other disruptive events. Reference numeral 300 will be generally used to connote "interior" restraining members, or, in other words, restraining members disposed within an outer periphery 105 of the elevated building surface assembly 100. Reference numeral 300' will be generally used to connote "peripheral" restraining members, or, in other words, restraining members disposed along the outer periphery 105 of the elevated building surface assembly 100. While the restraining members 300, 300' will be illustrated as different embodiments (e.g., see FIGS. 7a and 7b), it is to be understood that the embodiment of the restraining member 300' shown in FIG. 7b could be used in at least some situations for one or more of the restraining members 300, and vice versa.

As also used herein, support pedestals 201 identified as "$201_1$" (e.g., a "first portion" or "first group" of the support pedestals 201) indicate support pedestals 201 to which a restraining member 300, 300' is secured in a particular embodiment, while support pedestals 201 identified as "$201_2$" (e.g., a "second portion" or "second group" of the support pedestals 201) indicate support pedestals 201 to which a restraining member 300, 300' is not secured in a particular embodiment.

Before discussing the restraining members 300, 300' in more detail, additional discussion in relation to the surface tiles 102 and support pedestals 201 will now be provided. The surface tiles 102 can be comprised of virtually any material from which a building surface is constructed. Examples include, but are not limited to, slate tiles, natural stone tiles, composite tiles, concrete tiles (e.g., pavers), wooden deck tiles, including hardwood deck tiles, tiles of metal or fiberglass grating, rubber tiles and the like. The support pedestals 201 can be placed in a spaced-apart relation on fixed surfaces 103 including, but not limited to, rooftops, plazas, over concrete slabs including cracked concrete slabs, and can be placed within fountains and water features, used for equipment mounts, and the like. The elevated building surface assembly 100 can be used for both interior and exterior applications.

Figure 2:
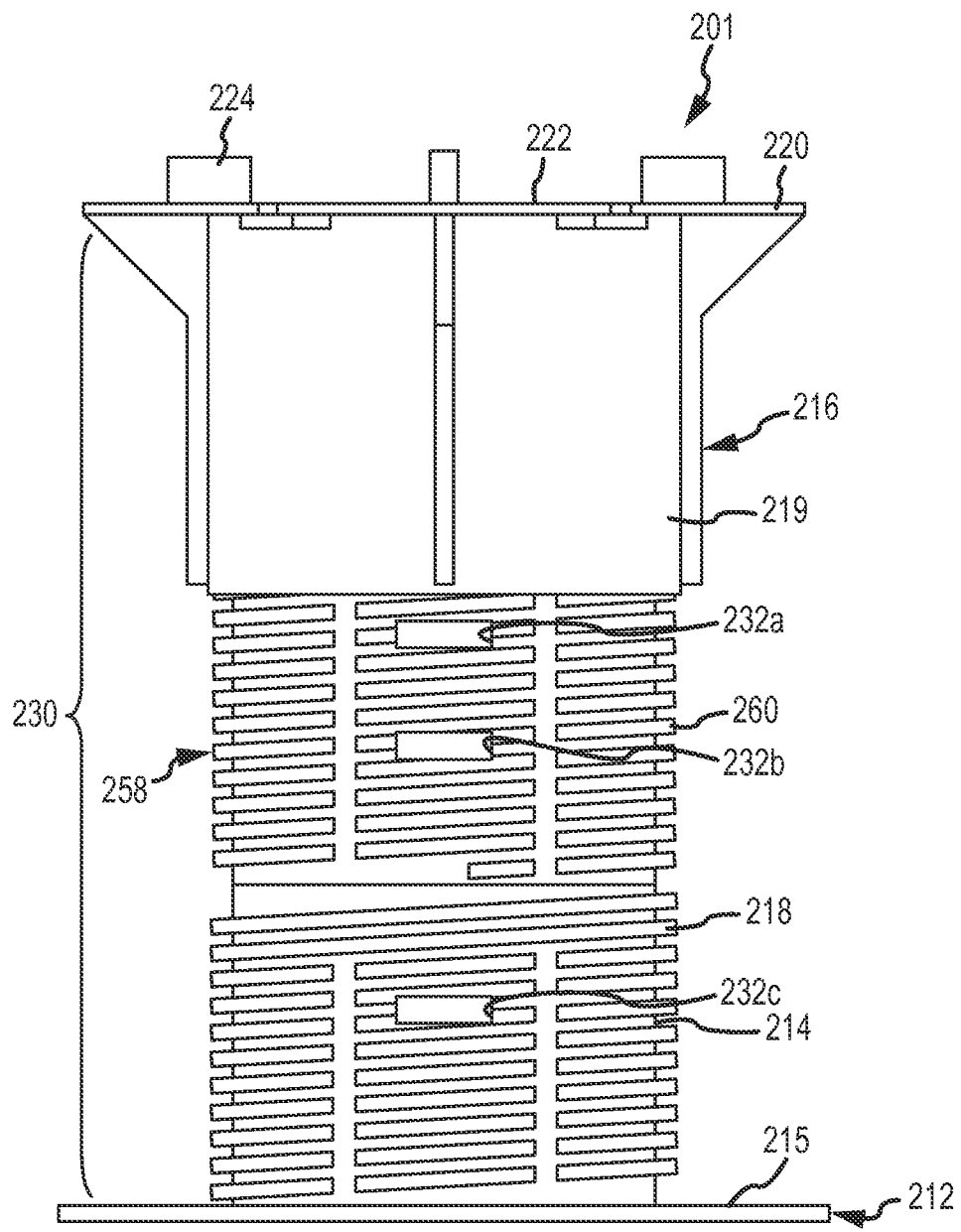
FIG. 2 is a side view of a support pedestal that may form part of a support structure of the elevated building surface assembly of FIG. 1.

Turning to FIG. 2, a side view of an exemplary support pedestal 201 (e.g., a height-adjustable support pedestal) that is configured to be placed upon the fixed surface 103 is illustrated. The support pedestal 201 may broadly include a base member 212 including a base member extension 214 (e.g., a cylindrical base member extension) that extends upwardly from a base member plate 215 when the support pedestal 201 is operatively placed on a fixed surface. The base member 212 includes base member threads 218 on a surface of the base member extension 214.

A support member 216 is adapted to be operatively connected to the base member 212, either directly or through a coupling (e.g., extension) member 258 that operatively attaches the base member 212 to the support member 216. The support member 216 includes a support plate 220 and a support member extension 219 (e.g., a cylindrical support member extension) that extends downwardly from the support plate 220. The support member 216 includes support member threads (not illustrated) on an interior surface of the support member extension 219 that are configured to rotatably (e.g., threadably) engage the base member threads 218 to operatively connect the support member 216 to the base member 212 and more specifically to operatively attach the support member extension 219 to the base member extension 214. Thus, the support member 216 can be mated directly to base member threads 218 and can be rotated relative to the base member 212 (e.g., the base member 212 can be rotated relative to the support member 216) to adjust the height of the support pedestal 201. The support plate 220 is thereby disposed above the base member 212 to support building surface components such as surface tiles 102 thereon (see FIG. 1). The support member threads may also be adapted to threadably engage with coupling member threads 260 to connect the support member 216 to the coupling member 258, which in turn may be operatively connected to the base member 212.

Although illustrated as having internal threads on the support member 216 and external threads on the base member 218 and coupling member 258, it will be appreciated that other configurations are possible, including external threads on the support member 216 and internal threads on the base member 218. See, for example, U.S. Pat. No. 5,588,264 by Buzon and U.S. Pat. No. 6,363,685 by Kugler, each of which is incorporated herein by reference in its entirety.

The support plate 220 includes a top surface 222 upon which the bottom surfaces 112 and corner portions 116 of adjacent surface tiles 102 (FIG. 1) can be placed. Spacers 224 can be provided on the top surface 222 of the support plate 220 to provide predetermined spacing between adjacent surface tiles 102 that form the elevated building surface 101. For example, the spacers 224 can be disposed on a crown member (not shown) that is placed in a recess (not shown) on the top surface 222 of the support plate 220. In this manner, the crown member can be rotated independent of the support member 216 to adjust the position of the spacers 224.

From a broad perspective, the support pedestal 201 may generally be in the form of the base member plate 215, the support plate 220, and a support pillar or central section such as a central section 230 extending between the base member plate 215 and the support plate 220. The central section 230 may include the base member extension 214 extending away from the base plate 215 and a support member extension 219 extending away from the support plate 220. In one arrangement, the central section 230 may also include at least one coupling member 258 extending between the base member extension 214 and the support member extension 219 that operatively attaches the base member extension 214 to the support member extension 219 and that is adapted to increase the obtainable height of the support pedestal 201. In another arrangement, the support pillar or central section may be in the form of only a single member which may be cylindrical or non-cylindrical (e.g., square-shaped cross-section). In this regard, the support pedestal 201 may have a fixed height and thus be non-adjustable. It is to be understood that any discussion herein in relation to the central section 230 may be equally applicable to such other forms of support pillars and central sections. In any event, a distance between the base member plate 215 and the support plate 220 may be at least about 2 inches but for most applications is not greater than about 30 inches. Examples of support pedestals are also disclosed in U.S. Pat. Nos. 7,921,612 and 8,156,694, both of which are assigned to the assignee of the present application, and both of which are incorporated by reference herein as if set forth in full.

Turning back to FIG. 1, each surface tile 102 may be placed upon several support pedestals 201 to elevate the surface tile 102 above the fixed surface 103. For instance, the surface tiles 102 may be rectangular (e.g., square) and a different support pedestal 201 may be disposed beneath corner portions 116 of adjacent surface tiles 102. Although illustrated in FIG. 1 as being laid out in a generally symmetric, square-shaped pattern, the support pedestals 201 can also be laid out in various other configurations as may be dictated by the shape and size of the surface tiles 102, such as a rectangular configuration or a triangular configuration.

Figure 3A:
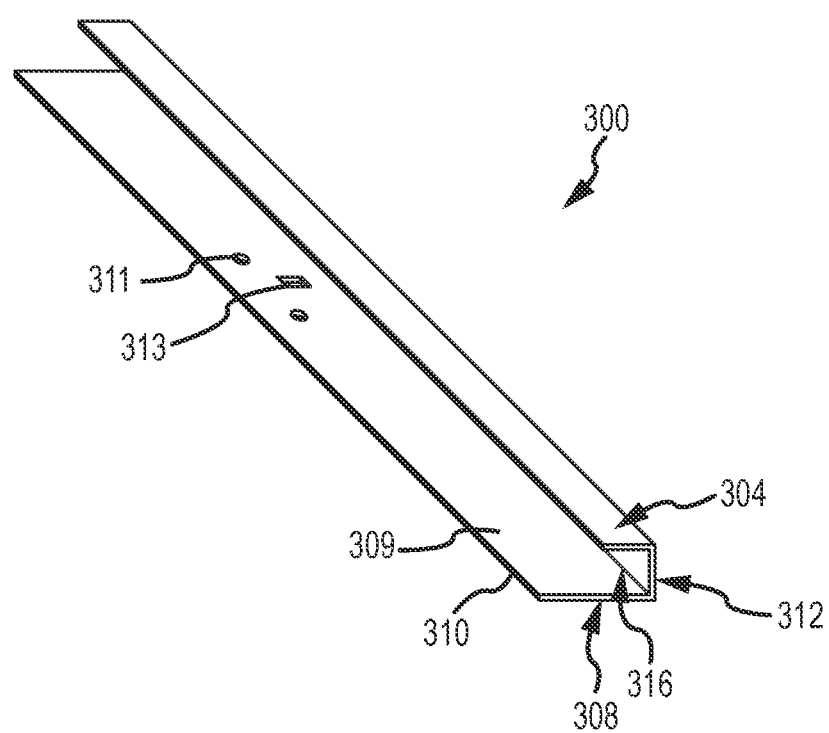
FIG. 3a is a perspective view of an elongate restraining member according to one embodiment that may be used as part of the support structure of the elevated building surface assembly of FIG. 1.
Figure 3B:
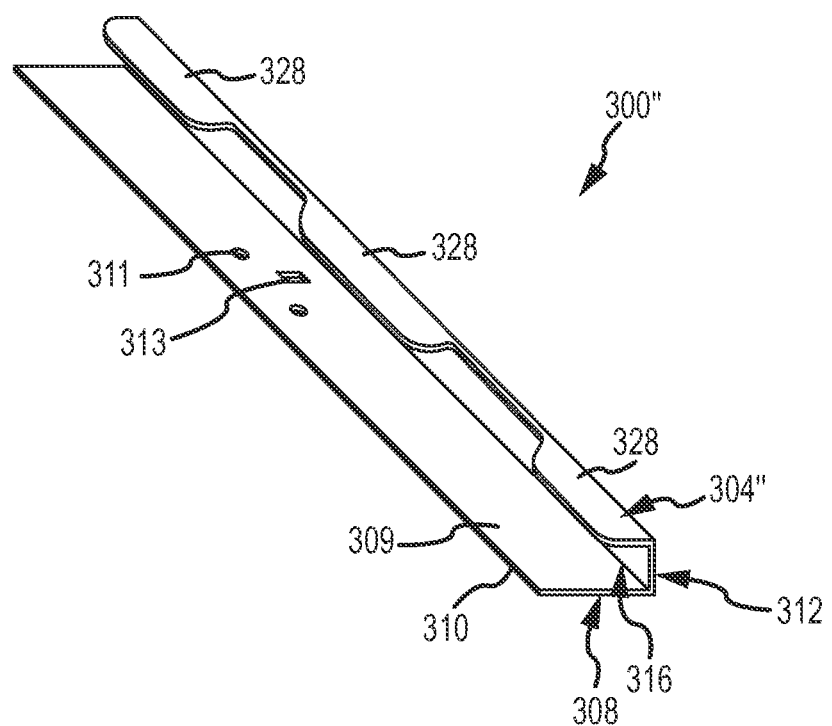
FIG. 3b is a perspective view of an elongate restraining member according to another embodiment that may be used as part of the support structure of the elevated building surface assembly of FIG. 1.
Figure 3C:
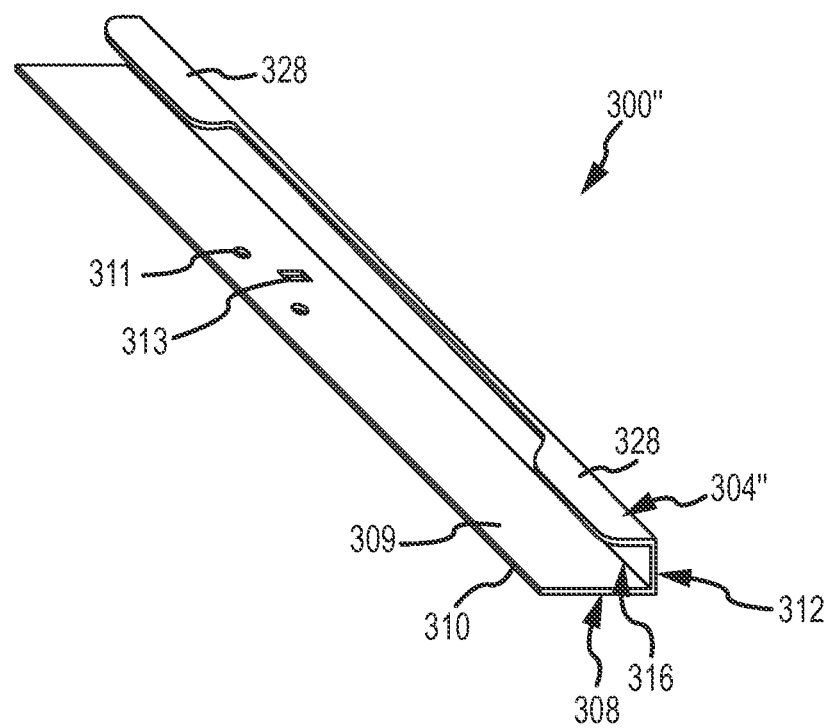
FIG. 3c is a perspective view of an elongate restraining member according to another embodiment that may be used as part of the support structure of the elevated building surface assembly of FIG. 1.
Figure 3D:
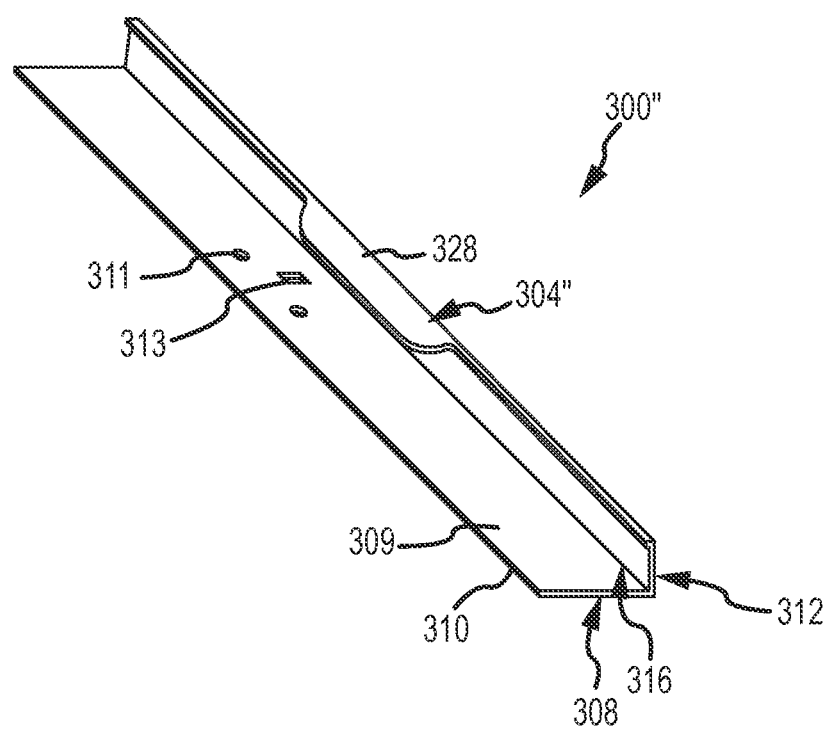
FIG. 3d is a perspective view of an elongate restraining member according to another embodiment that may be used as part of the support structure of the elevated building surface assembly of FIG. 1.

As mentioned above, the support structure 200 includes a plurality of elongate restraining members 300 that are broadly configured to be disposed adjacent or proximate outer edge segments 120 of one or more surface tiles 102 of the elevated building surface assembly 100 to limit movement or displacement of the surface tiles 102 relative to the support pedestals 201 and/or in relation to adjacent surface tiles 102. With additional reference now to the embodiment of FIG. 3a, a restraining member 300 may be designed to receive at least portions of outer edge segments 120 of one or more surface tiles 102, such as substantially collinear outer edge segments 120 of at least a pair of adjacent surface tiles 102. Broadly, the restraining member 300 includes a restraining element 304 and a mounting element 308 that is spaced apart from the restraining element 304 and operatively attached thereto via a connection element 312. In one arrangement, each restraining member 300 may be in the form of a C-shaped channel (e.g., as is illustrated in FIG. 3). The restraining element 304, mounting element 308 and connection element 312 collectively define a receiving chamber or space 316 for operatively receiving at least a portion of collinear outer edge segments 120 of surface tiles 102 of the elevated building surface assembly 100. FIGS. 3b-3d illustrate other embodiments of the restraining member 300 whereby the restraining element 304 may be in the form of one or more restraining tabs 328 configured to be disposed within corresponding apertures or openings formed in an outer edge segment 120 and/or corner portion 116 of one or more surface tiles 102.

In any event, each restraining member 300 may be formed in any appropriate manner and of any appropriate materials. In one arrangement, each restraining member 300 may be formed of an elongated piece of sheet metal of any appropriate gauge (e.g., at least about 28 gauge; not greater than about 6 gauge) so as to form a single, unitary structure. In one arrangement, the piece of sheet metal may be appropriately shaped or formed (e.g., bended, folded, stamped, etc.) to form the restraining element 304, mounting element 308, and connection element 312. In another arrangement, the restraining element 304, mounting element 308, and connection element 312 may each initially be in the form of respective pieces of elongated sheet metal which are appropriately secured together (e.g., via welding) to form the restraining member 300. Furthermore, the restraining and mounting elements 304, 308 may in some arrangements be substantially parallel to each other while the connection element 312 may be substantially perpendicular to one or both of the restraining and mounting elements 304, 308. In one arrangement, the restraining element 304 may be angled slightly towards the mounting element 308 so as to create a bias force against a surface tile 102 disposed within the receiving space 316. As an alternative to forming the restraining members 300 from sheet metal, the restraining members 300 may also be constructed in other manners (e.g., via thermoforming, extrusion, pultrusion, etc.) and/or from other materials (e.g., plastics, metals, fiber reinforced composites, etc.).

Figure 4:
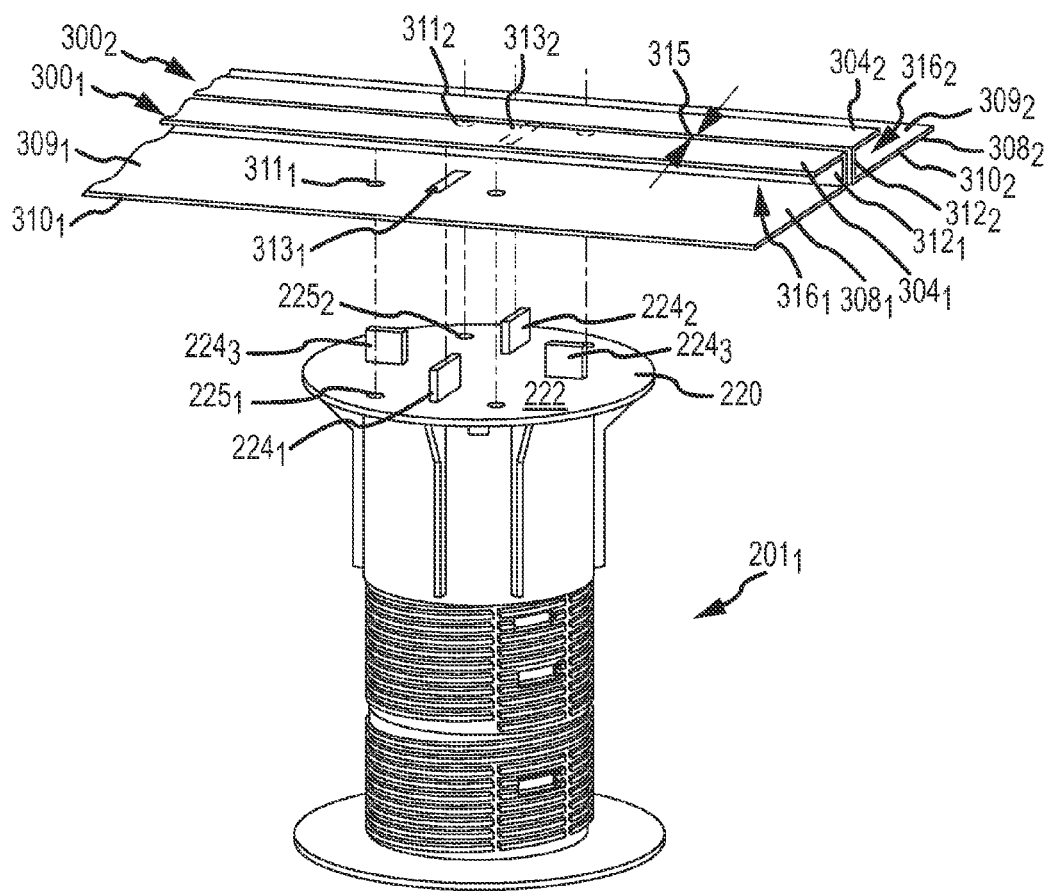
FIG. 4 is a perspective view of a pair of the elongate restraining members of FIG. 3 being disposed over a top surface of a support pedestal.
Figure 5:
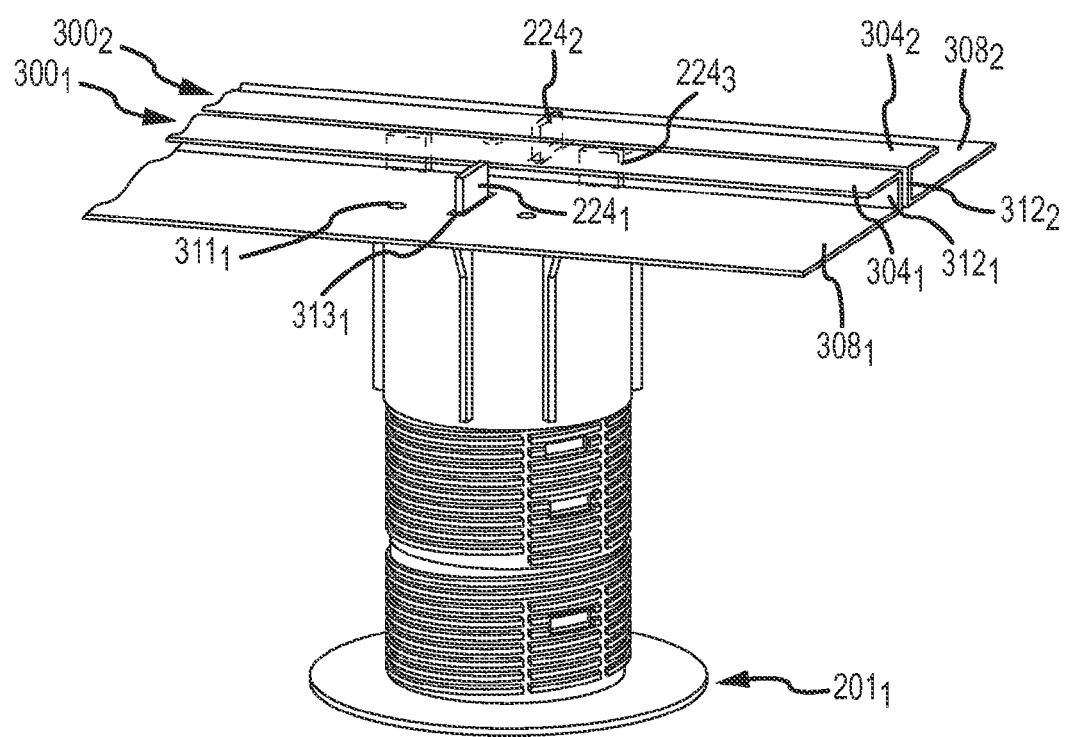
FIG. 5 is a perspective view similar to FIG. 4, but showing the pair of elongate restraining members being disposed on the top surface of the support pedestal.

FIGS. 4-5 illustrate an exemplary process of securing first and second restraining members $300_1$, $300_2$ to a top surface 222 of a support pedestal $201_1$, where each of the first and second restraining members $300_1$, $300_2$ is configured to receive and restrain one or more surface tiles 102 against movement relative to the support pedestal 201 and/or adjacent surface tiles 102. While the first and second restraining members $300_1$, $300_2$ will be shown being secured to one support pedestal $201_1$, it is to be understood that one or both of the first and second restraining members $300_1$, $300_2$ could be secured in a similar manner to the top surface 222 of a plurality of support pedestals $201_1$ of the elevated building surface assembly 100, such as to a plurality of support pedestals $201_1$ in a substantially linear row or column of support pedestals $201_1$ or the like.

Initially, a bottom surface $310_1$, $310_2$ of the mounting elements $308_1$, $308_2$ of each of the first and second restraining members $300_1$, $300_2$ may be placed on or otherwise disposed over a top surface 222 (e.g., of a support plate 220) of the support pedestal on opposing sides of spacers $224_3$. As shown, the first and second restraining members $300_1$, $300_2$ may be placed in a "back to back" orientation so that their connection elements $312_1$, $312_2$ are abutting and so that their receiving spaces $316_1$, $316_2$ generally face away from each other so as to receive one or more respective surface tiles 102. As used herein, the term "abutting" and variations thereof (e.g., abut, abuts) indicates a facing and closely spaced relative positioning (e.g., direct contact, separated by only a slight gap, such as provided by spacers 224, etc.) between components (e.g., between connection elements $312_1$, $312_2$ of a pair of restraining members 300, between outer edge segments 120 of a pair of surface tiles 102, etc.). As also used here, the term "non-abutting" and variations thereof indicates components that are not facing each other (e.g., that are facing opposite directions, that are collinearly arranged relative to each other, etc.).

In one arrangement, the first and second restraining members $300_1$, $300_2$ may be mechanically affixed to the top surface 222 of the support pedestal $201_1$. For instance, the mounting elements $308_1$, $308_2$ may each have one or more respective first mounting apertures $311_1$, $311_2$ (e.g., countersunk holes, non-countersunk holes) extending fully or at least partially therethrough that are sized, shaped and/or and positioned to align with corresponding apertures $225_1$, $225_2$ within the top surface 222 of the support pedestal $201_1$. Upon placement of the bottom surfaces $310_1$, $310_2$ of the mounting elements $308_1$, $308_2$ over the top surface 222 of the support pedestal $201_1$ as discussed above, fasteners (e.g., bolts, screws, etc., not shown) may be inserted through the respective pairs of apertures $311_1/225_1$, $311_2/225_2$ to secure the first and second restraining members $300_1$, $300_2$ to the top surface 222 of the support pedestal. See FIG. 5. In one arrangement, the fasteners could be configured to self-tap into the top surface 222 of the support pedestal $201_1$ (e.g., without requiring an aperture in the top surface 222 of the support pedestal). In another arrangement, the bottom surfaces $310_1$, $310_2$ of the mounting elements $308_1$, $308_2$ may be mechanically affixed to the top surface 222 of the support pedestal $201_1$ in other manners not necessarily requiring mounting apertures $311_1$, $311_2$ such as via spring-loaded locking members, flexible tangs/snaps/clips, and/or the like. Of course, other manners of securing the mounting elements $308_1$, $308_2$ to the top surface 222 are envisioned such as via adhesives, welding, and/or the like.

In one arrangement, the mounting elements $308_1$, $308_2$ may each have one or more respective second mounting apertures $313_1$, $313_2$ that are sized, shaped and/or positioned to receive corresponding spacers $224_1$, $224_2$ extending from the top surface 222 of the support pedestal $201_1$. Returning to FIG. 4, for instance, the second mounting apertures $313_1$, $313_2$ may be disposed over the corresponding spacers $224_1$, $224_2$ and then moved towards the top surface 222 so as to receive the spacers $224_1$, $224_2$ as shown in FIG. 5. In addition to limiting lateral movement of the first and second restraining members $300_1$, $300_2$ (e.g., in directions generally parallel to the top surface 222), receipt of the spacers $224_1$, $224_2$ in the second mounting apertures $313_1$, $313_2$ may serve to align the respective pairs of apertures $311_1/225_1$, $311_2/225_2$. In one arrangement, the top surface 222 may not include any (pre-formed) apertures $225_1$, $225_2$. In this arrangement, however, receiving the spacers $224_1$, $224_2$ through the corresponding second mounting apertures $313_1$, $313_2$ may serve to align the first mounting apertures $311_1$, $311_2$ with locations on the top surface 222 into which the fasteners may be threaded or otherwise inserted. While each second mounting aperture $313_1$, $313_2$ has been illustrated as having a rectangular shape, it is envisioned that each second mounting aperture $313_1$, $313_2$ could have other shapes such as circular, other polygonal shapes, and/or the like.

Figure 6:
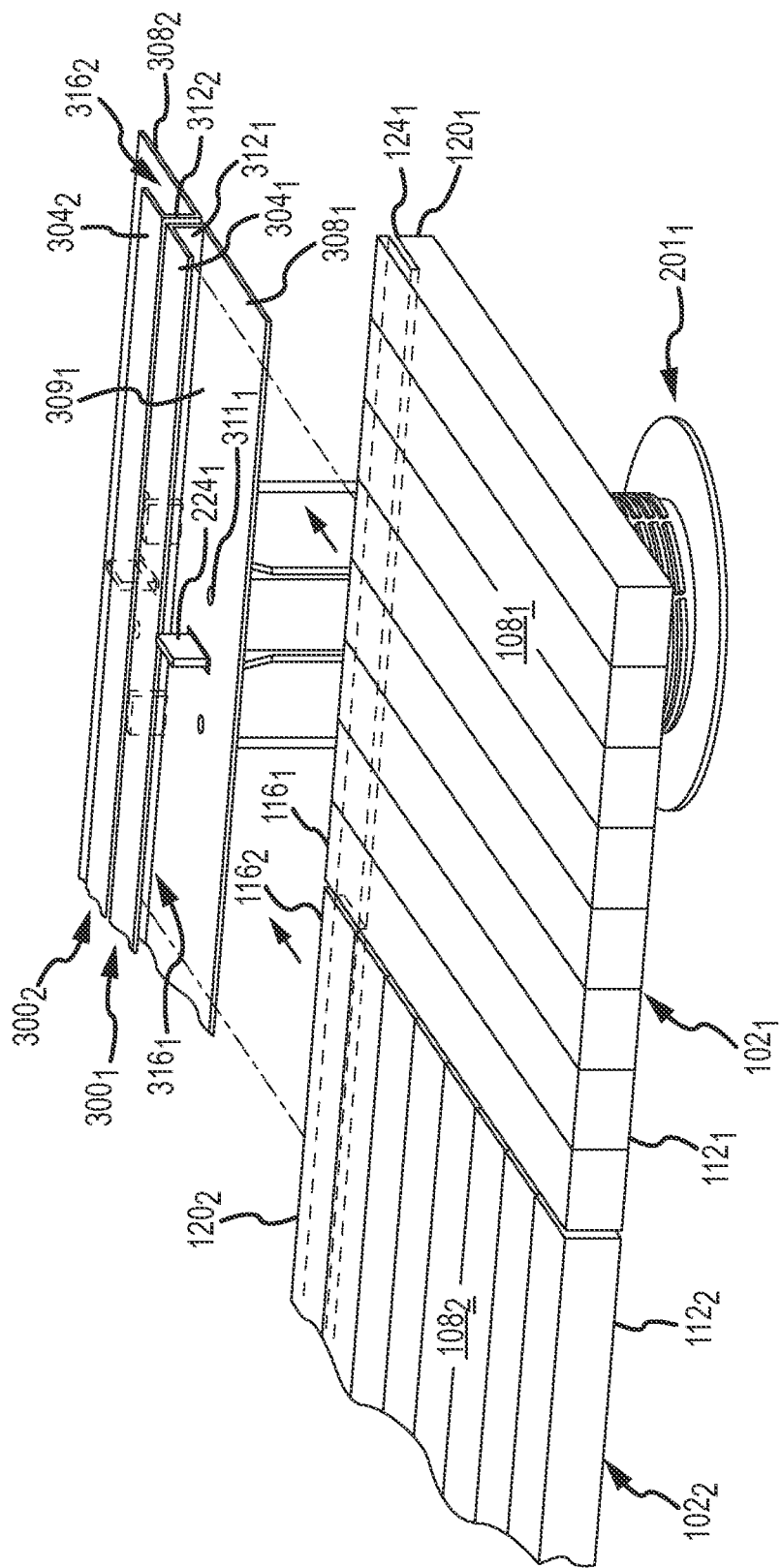
FIG. 6 is a perspective view similar to FIG. 5, but showing a pair of surface tiles about to be inserted into one of the elongate restraining members.

Once the mounting elements $308_1$, $308_2$ have been secured to the top surface 222 of the support pedestal $201_1$ as shown in FIG. 5, one or more surface tiles 102 may be inserted into the receiving spaces $316_1$, $316_2$ of the first and second restraining members $300_1$, $300_2$. See FIG. 6. In the interest of clarity, surface tiles 102 have not been shown for insertion into the receiving space $316_2$ of the second restraining member $300_2$ in FIG. 6. For instance, first and second surface tiles $102_1$, $102_2$ may be inserted into the receiving space $316_1$ of the first restraining member $300_1$ on opposing sides of the spacer $224_1$, such that substantially collinear outer edge segments $120_1$, $120_2$ and respective corner portions $116_1$, $116_2$ of the first and second surface tiles $102_1$, $102_2$ are at least partially received in the receiving space $316_1$, and so that bottom surfaces $112_1$, $112_2$ of the first and second surface tiles $102_1$, $102_2$ are at least partially disposed over and/or abut a top surface $309_1$ of the first mounting element $308_1$.

Figure 7A:
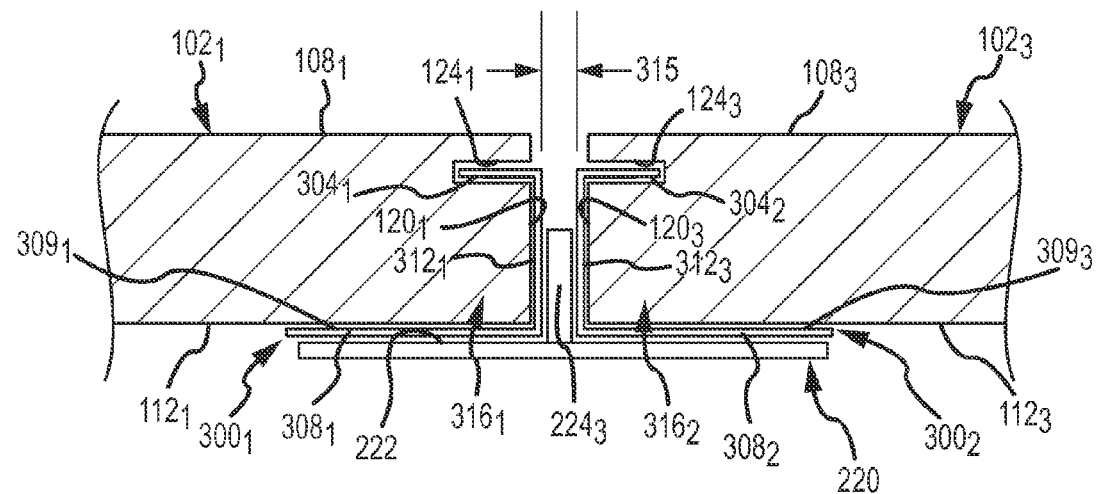
FIG. 7a is a cross-sectional view of the pair of elongate restraining members of FIGS. 4-6 restraining a pair of surface tiles against movement relative to a top surface of the support pedestal, according to one embodiment.

FIG. 7a illustrates a cross-sectional view of the first surface tile $102_1$ being inserted into the first receiving space $316_1$ and a third surface tile $102_3$ (not shown in FIG. 6) being inserted into the second receiving space $316_2$ such that a first outer edge segment $120_1$ of the first surface tile $102_1$ abuts a first outer edge segment $120_3$ of the third surface tile $102_3$. In one arrangement, one or more spacers $224_3$ extending from the top surface 222 of the support pedestal may be disposed between the connection elements $312_1$, $312_3$ of the first and third restraining members $300_1$, $300_2$ to space the connection elements $312_1$, $312_3$ a distance 315 from each other. In another arrangement, the one or more spacers $224_3$ may not be disposed between the connection elements $312_1$, $312_3$ and the connection elements $312_1$, $312_3$ may or may not be spaced from each other.

It can be seen how the restraining element $304_1$ of the first restraining member $300_1$ may be received within a correspondingly shaped, sized and/or positioned receiving aperture or opening $124_1$ disposed within the outer edge segment $120_1$ and spaced from and disposed between the top and bottom surfaces $108_1$ and $112_1$ (a similar discussion applies to third surface tile $102_3$ relative to the second restraining member $300_2$). For instance, the receiving opening $124_1$ may be in the form of an elongated slot, where the slot is spaced a distance from the bottom surface $112_1$ that is approximately the same as the distance between the mounting and restraining elements $308_1$ and $304_1$. In this regard, upon resting the bottom surface $112_1$ of the surface tile $102_1$ on the top surface $309_1$ of the connection element $308_1$, the surface tile $102_1$ may thereafter be pushed in the direction of the arrows in FIG. 6 to allow the outer edge segment $120_1$ to enter the receiving space $316_1$ and the receiving opening $124_1$ to receive the restraining element $304_1$ as illustrated in FIG. 7a.

Figure 8:
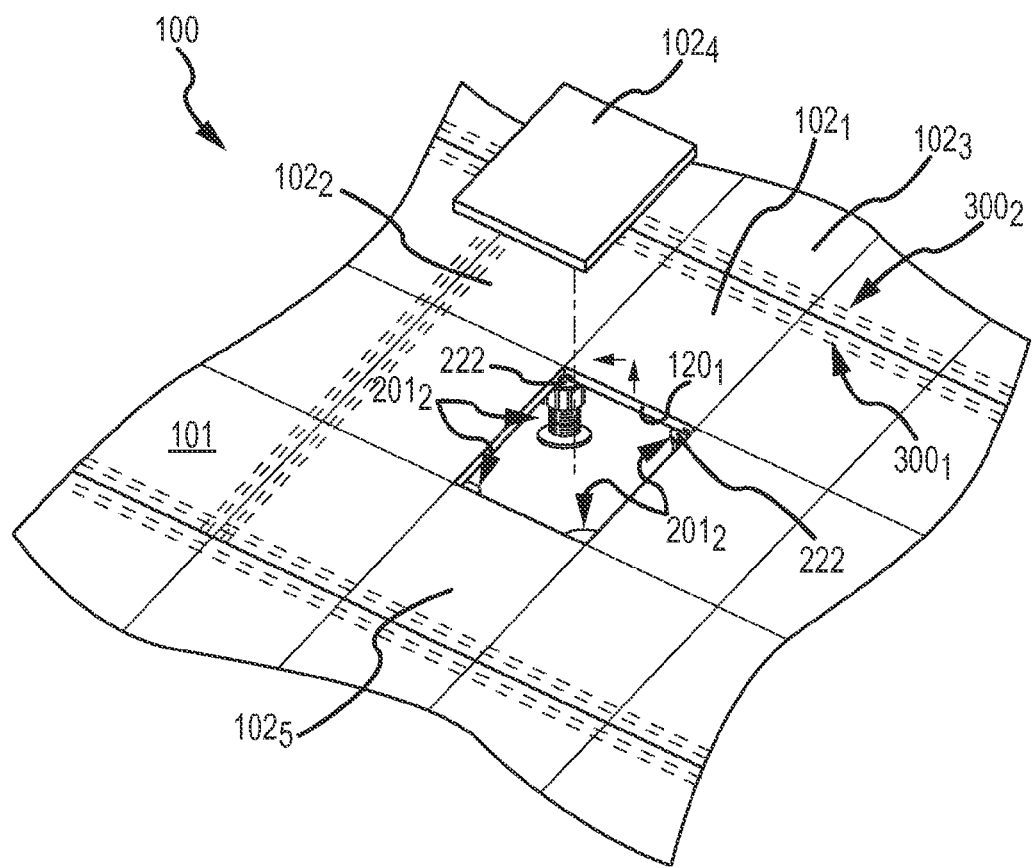
FIG. 8 is a perspective view of a portion of the elevated building surface assembly of FIG. 1 in one state of assembly.

With reference to FIG. 8, it can be seen how after restraining a first outer edge segment of the first surface tile $102_1$ with the first restraining member $300_1$, a second, opposing outer edge segment $120_1$ of the first surface tile $102_1$ may be placed on top surfaces 222 of respective support pedestals $201_2$ to thereby add the top surface (not labeled in FIG. 8) of the first surface tile $102_1$ to the elevated building surface 101 of the elevated building surface assembly 100. A similar process may be performed for other surface tiles 102 restrained by the first restraining member $300_1$.

The elevated building surface 101 may also include surface tiles 102 that are not directly restrained by the restraining members 300. That is, one or more of the surface tiles 102 may not have their outer edge segments 120 restrained by the restraining members 300. For instance, FIG. 8 also shows a surface tile $102_4$ that may be placed over a plurality of support pedestals $201_2$ (e.g., four support pedestals $201_2$ corresponding to the four corner portions 116 of the surface tile $102_4$), where the surface tile $102_4$ is not directly restrained by a restraining member 300 (e.g., note absence of restraining members 300, 300' adjacent surface tile $102_4$ in FIGS. 8-10). To allow for ready removal of a surface tile 102 that is directly restrained by a restraining member 300 (e.g., surfaces tile $102_1$ or $102_5$), an adjacent surface tile 102 that is not directly restrained by one of the restraining members 300 (e.g., surface tile $102_4$) may first be removed (e.g., see FIG. 8) to provide access to an exposed outer edge segment 120 of the surface tile 102 (e.g., second outer edge segment $120_1$ of surface tile $102_1$). The surface tile 102 (e.g., surface tile $102_1$) may then be pulled away from its respective restraining member 300 (e.g., in a direction opposite arrows in FIG. 6) to remove the surface tile 102 from the elevated building surface assembly 100. See FIG. 10.

In one arrangement, any appropriate tie-down device accessible from above the elevated building surface 101 may be used to secure one or more corner portions 116 of the surface tiles to the support pedestals $201_2$ (i.e., support pedestals 201 free of restraining members 300). For instance, an anchoring washer and fastener (e.g., such as that disclosed in U.S. Patent App. Pub. No. 2011/0016809, which is assigned to the assignee of the present application, and which is incorporated herein by reference as if disclosed in full) may be used to secure corner portions 116 of surface tiles 102 to support pedestals $201_2$. In this regard, a user could insert any appropriate tool (e.g., screwdriver, wrench) between adjacent corner portions 116 of surface tiles 102 over a support pedestal $201_2$ and manipulate a corresponding fastener to allow for lifting of the corner portions 116 away from the support pedestal $201_2$.

In some arrangements, and referring back to FIG. 1, it may be desirable to additionally or alternatively resist movement (e.g., upward movement) of surface tiles 102 adjacent the outer periphery 105 of the elevated building surface assembly 100 away from a corresponding support pedestal 201 and/or adjacent surface tiles 102, such as due to uplift forces (e.g., generated by wind and/or other environmental events). For instance, at least one parapet 400 (see FIG. 1) may extend upwardly away from the fixed surface 103 (e.g., such as the roof of a building), generally surrounding the outer periphery 105 of the elevated building surface assembly 100, where the parapet 400 has one or more parapet sections such as first and second parapet sections 404, 408. As part of constructing the elevated building assembly 100, one or more peripheral restraining members 300' may be secured to one or more support pedestals $201_1$ adjacent the parapet 400 so as to receive and restrain surface tiles 102 adjacent the outer periphery 105 of the elevated building surface assembly 100.

Figure 7B:
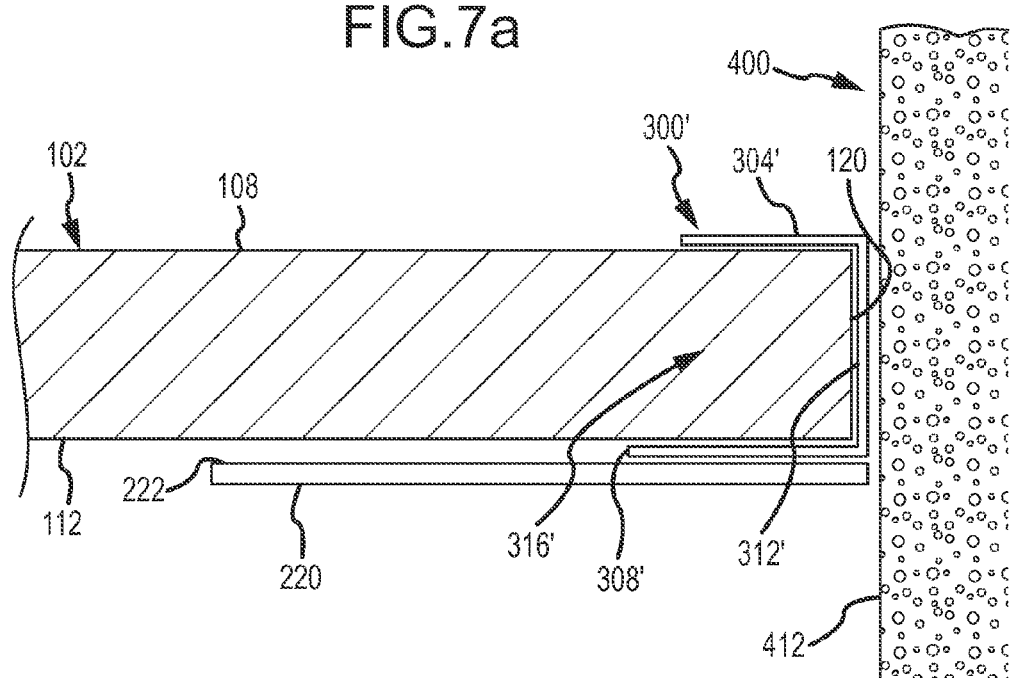
FIG. 7b is a cross-sectional view of an elongate restraining member similar to one of those of FIGS. 4-6 and restraining surface tile adjacent a periphery of an elevated building surface and a parapet against movement relative to a top surface of the support pedestal, according to another embodiment.

Turning to FIG. 7b, a restraining member 300' may be disposed over and secured to the top surface 222 of each support pedestal in a row or column of support pedestals adjacent an inner surface 412 of the parapet 400. Each restraining member 300' may be shaped and/or configured so that the distance between the restraining and connection elements 304', 308' is substantially the same as the distance between the top and bottom surfaces 108, 112 (i.e., the thickness) of a corresponding surface tile 102. Outer edge segments 120 (collectively forming part of the outer periphery 105) of a plurality of surface tiles 102 (e.g., surface tiles $102_5$, $102_6$, and $102_7$ in FIG. 1) may then be fully inserted into the receiving space 316' of the peripheral restraining member 300' so that the restraining element 304' rests on or is otherwise disposed closely adjacent the top surface 108 of the surface tile 102. While not shown, a restraining member could in some arrangements include a restraining element configured to be received in at least one corresponding receiving opening in the outer edge segment 120 of a surface tile 102 and a second restraining element 304' configured to be received over and to contact or abut a top surface 108 of the surface tile 120.

In one arrangement, the restraining member 300' may be secured to and positioned relative to the top surfaces of the support pedestals $201_1$ in a manner similar to the manner in which restraining member $300_1$ is secured to the top surface 222 of support pedestal $201_1$ in FIGS. 4-5. In this arrangement, a gap would exist between the inner surface 412 of the parapet 400 and the connection element 312' of the restraining member 300' because no restraining member would be disposed where restraining member $300_2$ is shown in FIGS. 4-5. In another arrangement, the restraining member 300' may be secured to and aligned relative to the top surface 222 by engaging with the spacer $224_2$ and apertures $225_2$ of FIG. 4, but where the receiving space 316' opens in a direction similar to that in which the receiving space $316_1$ of restraining member $300_1$ opens in FIG. 4.

As shown in FIG. 7b, the connection element 312' of the restraining member 300' may be disposed adjacent the inner surface 412 of the parapet 400 so that the bottom surface 112 of the surface 102 is disposed over a substantial majority of the top surface 222 of the support pedestal 201₁ (instead of only about half of the surface area of the top surface 222 as in FIG. 4). In this arrangement, the top surface 222 may be devoid of the spacers 224₃ shown in FIGS. 4-6 to allow one or more surface tiles 102 to slide into the receiving space 316' and be disposed over the top surface 222. In any event, the connection element 312' may be allowed to float relative to the inner surface 412 of the parapet 400 or be secured to the inner surface 412 of the parapet 400 (e.g., via fasteners being inserted/threaded through the connection element 312' and into the inner surface 412).

Figure 11:
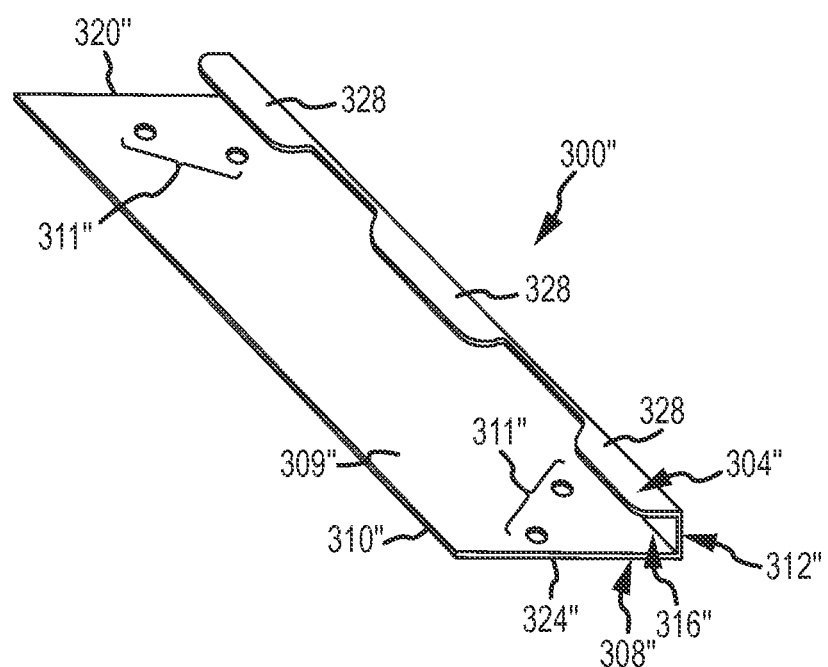
FIG. 11 is a perspective view of an elongate restraining member according to another embodiment that may be used as part of the support structure of the elevated building surface assembly of FIG. 1.
Figure 12:
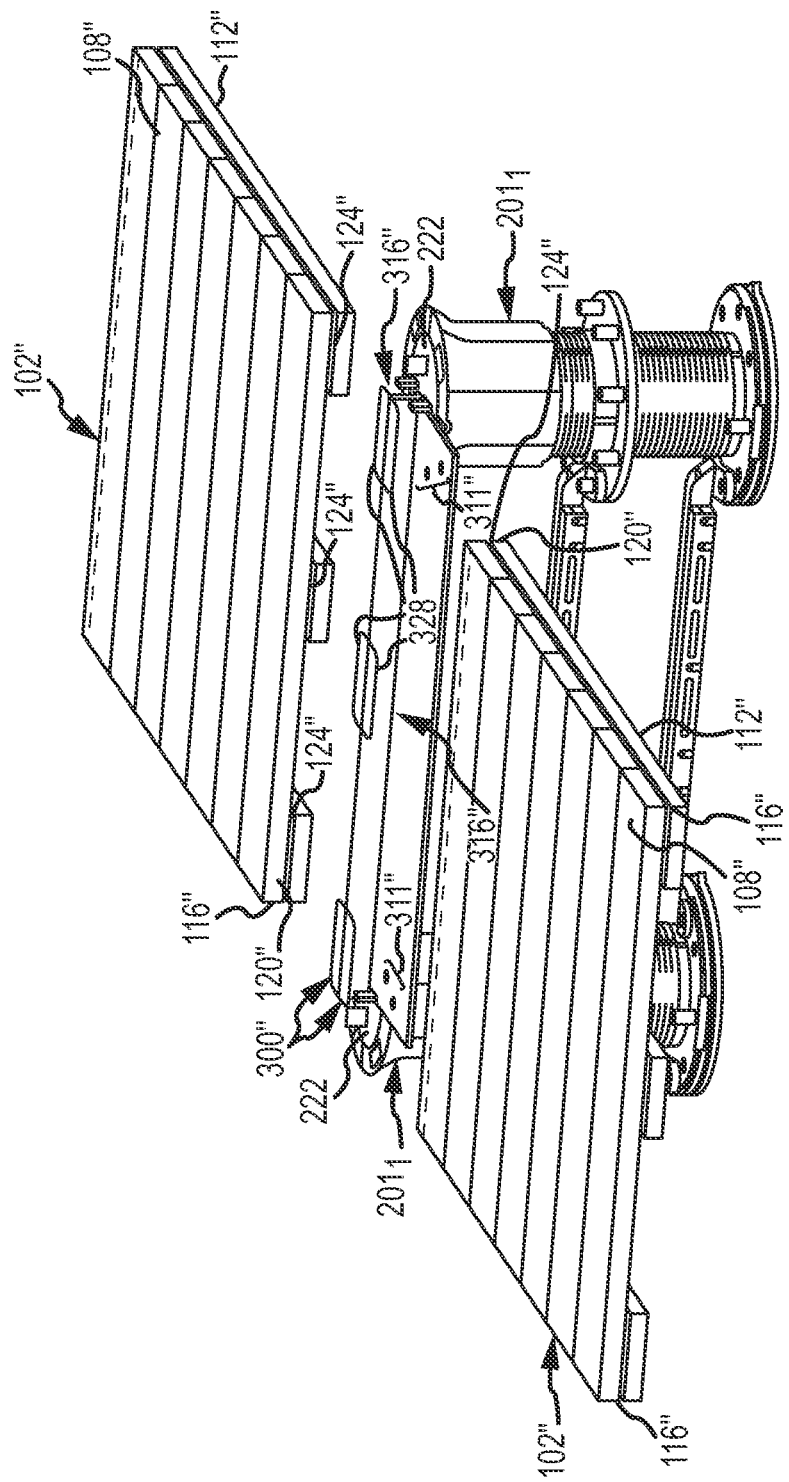
FIG. 12 is a perspective view of a pair of the elongate restraining members of FIG. 11 being disposed on top surfaces of a pair of support pedestal and with a pair of surface tiles about to be respectively inserted into the elongate restraining members.
Figure 13:
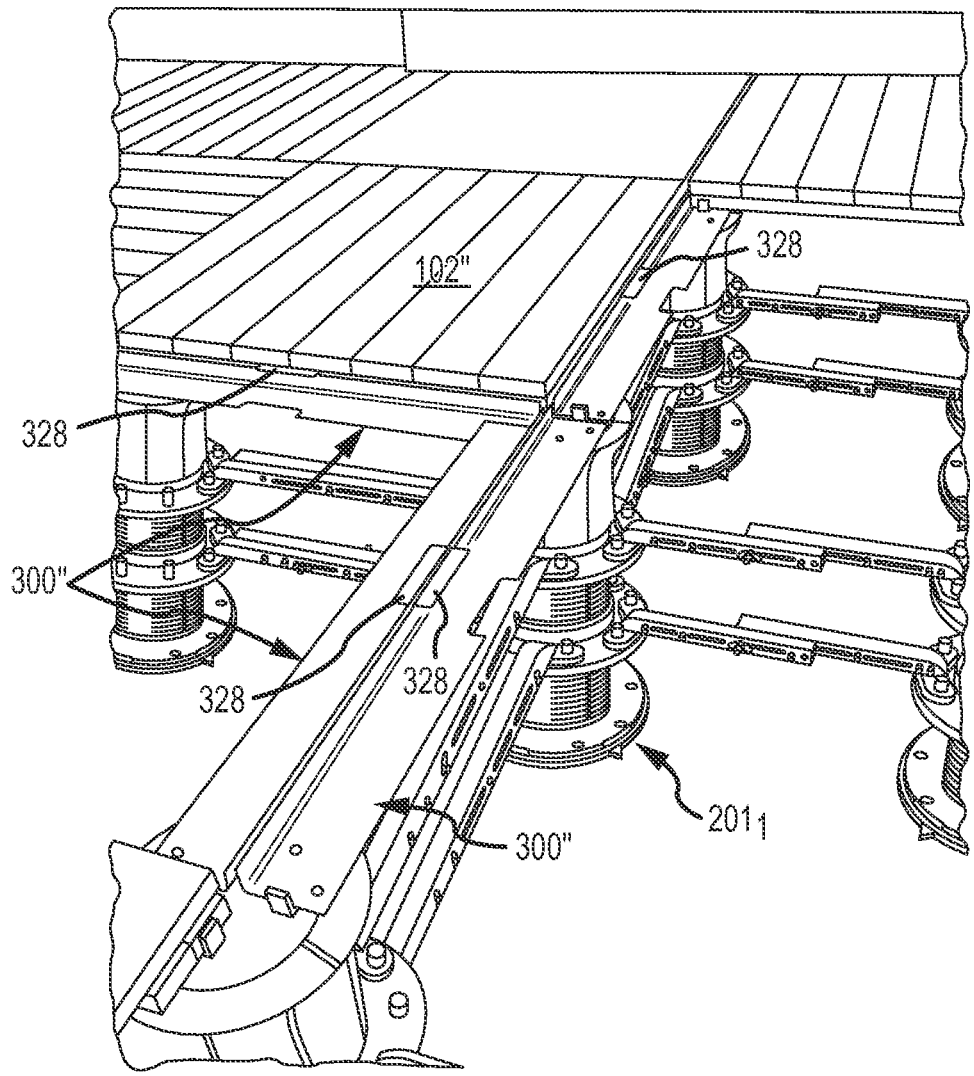
FIG. 13 is a perspective view of a partially assembled elevated building surface assembly including a plurality of the elongated restraining members of FIG. 11.

Turning now to FIGS. 11-13, another embodiment of a restraining member 300" is illustrated for use as part of the support structure 200 to elevate the surface tiles 102 above the fixed surface 103 (where the restraining member 300" be used as an interior or peripheral restraining member). One difference between the restraining member 300" of FIGS. 11-13 and the restraining member 300 of FIGS. 3-6 is that first and second opposing free ends 320", 324" of the restraining member 300" are respectively configured to rest over and be secured to the top surfaces 222 of the support plates 220 of a pair of adjacent support pedestals 201₁. See FIG. 12. As each restraining member 300" is thus for use with only a pair of adjacent support pedestals 201₁, use of the restraining members 300" (e.g., either in conjunction with or as an alternative to the restraining members 300) advantageously increases the modularity of an elevated building surface assembly 100. For instance, the adjacent restraining members 300" may be disposed at right angles to each other over the support plate of a common support pedestal 201₁ depending upon the configuration necessary for a particular elevated building surface assembly 100. See FIG. 13. It is noted that elevated building surface assemblies may or may not include the bracing members illustrated in FIG. 13 between adjacent support pedestals 201 depending upon the particular requirements of a particular assembly.

The mounting element 308" may have one or more respective mounting apertures 311" (e.g., countersunk holes, non-countersunk holes) extending fully or at least partially therethrough adjacent each of the first and second free ends 320", 324". Each mounting aperture 311" is sized, shaped and/or and positioned to align with a corresponding aperture (not shown) within the top surface 222 of one of the pair of adjacent support pedestals 201₁. For instance, upon placement of the bottom surfaces 310" of the mounting elements 308" of first and second "back to back" restraining members 300" over the top surfaces 222 of the pair of adjacent support pedestals 201₁ as shown in FIG. 12 (e.g., and where spacers extending from the top surfaces 222 could be disposed between the abutting connection elements 312" of the first and second restraining members 300" similar to in FIG. 7a), fasteners (e.g., bolts, screws, etc., not shown) may be inserted through the various apertures 311" and into the top surfaces 222 of the pair of adjacent support pedestals 201₁ to secure the first and second restraining members 300" to the top surfaces 222 of the pair of adjacent support pedestals 201₁.

Alternatively, the fasteners could be configured to self-tap into one or both of the mounting elements 308" and the top surfaces 222 of the pair of adjacent support pedestals 201₁ (e.g., without requiring pre-formed apertures). In one arrangement, any appropriate indicia (e.g., marks, texturing, etc.) may be disposed on the mounting elements 308" and/or the top surfaces 222 to convey to an installer where apertures are to be formed. Still further, welding and/or adhesives may be used to secure the first and second free ends 320", 324" to the top surfaces 222 of the support plates 220 of the pair of adjacent support pedestals 201₁ as alternatives to the use of fasteners and apertures as discussed previously.

The restraining element 304" of the restraining member 300" may be in the form of one or more restraining tabs 328 configured to be received within at least one receiving opening 124" (e.g., a kerf cut) disposed within an outer edge segment 120" of a surface tile 102" or disposed over a top surface 108" of the surface tile 102". In use, one or more restraining members 300" may be disposed over and secured to the top surfaces 222 of a pair of adjacent support pedestals 201₁ as discussed above. See FIG. 12. Portions of outer edge segments 120" of surface tiles 102" may be inserted into the receiving spaces 316" of the restraining members 300" so that the one or more restraining tabs 328 are received in the receiving openings 124" of the surface tiles 102". While three restraining tabs 328 have been illustrated in FIG. 11, the restraining element 304" may have other numbers of tabs 328 (e.g., similar to the restraining element 304 illustrated in FIGS. 3a-3d). For instance, the restraining members 300" illustrated in FIG. 13 include restraining members having only a single restraining tab 328. Furthermore, some embodiments of the restraining element 304" may be in the form of a single continuous member as is the restraining element 304 of the restraining member 300 of FIGS. 3-6.

Figure 14:
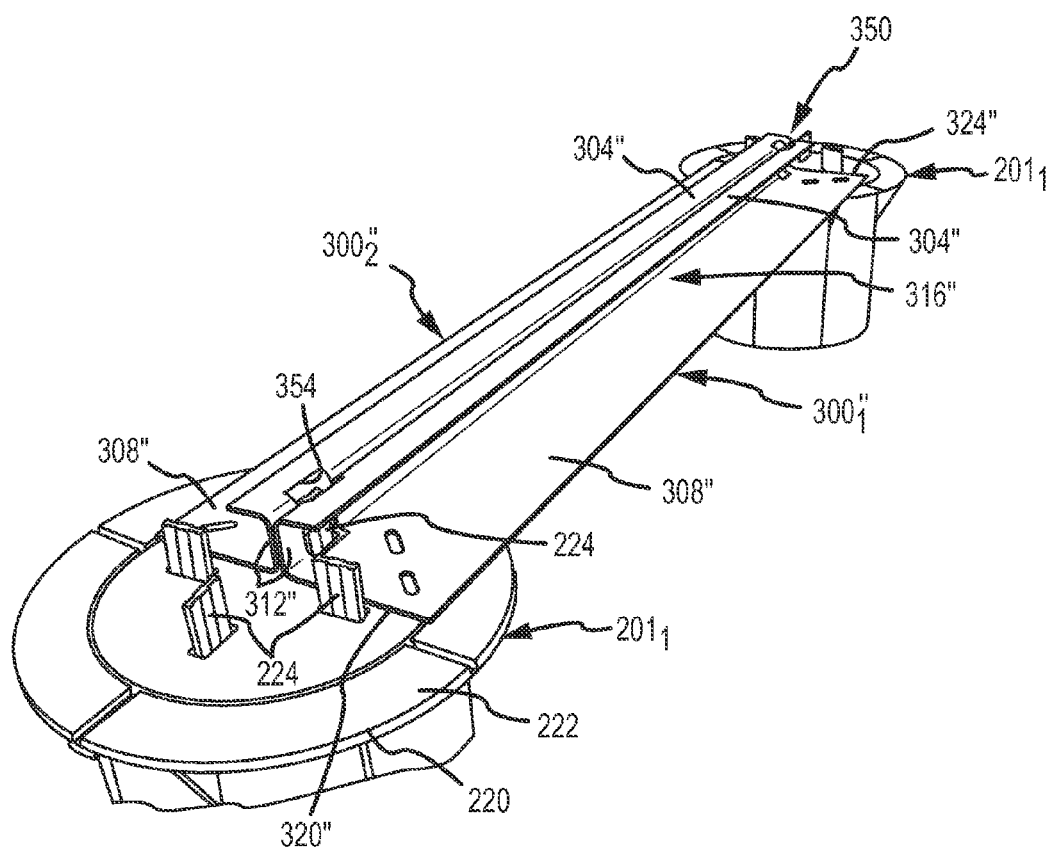
FIG. 14 is a perspective view of a restraining unit according to one embodiment that may be used as part of the support structure of the elevated building surface assembly of FIG. 1.

In one arrangement, first and second restraining members 300₁", 300₂" may be secured together in a back-to-back arrangement to form a restraining unit 350 that may be placed over and secured to the top surfaces 222 of a pair of adjacent support pedestals 201₁. See FIG. 14. For instance, the connection elements 312" of the first and second restraining members 300₁", 300₂" may be placed against each other and then the respective connection elements 312" may be clinched together at one or more locations to fasten the first and second restraining members 300₁", 300₂" together. As another example, welding, fasteners and apertures, and/or the like may be used to secure the respective connection elements 312" to each other and thus fasten the first and second restraining members 300₁", 300₂" together.

In one embodiment, the restraining unit 350 may include one or more apertures 354 extending therethrough adjacent the first and second free ends 320", 324" for receiving one or more respective spacer tabs 224 extending away from the top surface 222 of the support plate 220 of the pair of adjacent support pedestals 201₁. For instance, each aperture 354 may be formed through portions of the mounting elements 308", connection elements 312" and restraining elements 304" of both of the first and second restraining members 300₁", 300₂" so as to be configured to receive a respective spacer tab 224 extending between the first and second restraining members 300₁", 300₂". While the restraining elements 304" of the restraining unit 350 have been shown in the form of single continuous members, other arrangements envision that one or both of the restraining elements 304" could be in the form of one or more restraining tabs 328 as discussed in relation to other embodiments disclosed herein. Furthermore, any of the restraining members 300 in FIGS. 3a-3d could also be used to construct corresponding restraining units.

One method for constructing the elevated building surface assembly 100 will now be described, although numerous other methods and manners of constructing the assembly 100 are also envisioned. Initially, a plurality of support pedestals 201 may be appropriately located upon the fixed surface 103 with any appropriate predetermined spacing between the support pedestals 201 and in any appropriate arrangement, such as a plurality of substantially linear rows and columns of support pedestals 201 (e.g., such as perpendicular rows and columns as shown in FIG. 1). Part of this step may in some situations include aligning (e.g., leveling) the top surfaces 222 of the support pedestals 201 via adjusting (e.g., rotating) the base and support member extensions 214, 219 relative to each other. This step may also include appropriately aligning, orienting or adding spacer tabs 224 in a manner to allow a desired building surface 101 to be formed.

Any appropriate arrangement of restraining members 300, 300', 300" (e.g., and/or restraining units 350) may also be secured to the top surfaces 222 of a first portion of the support pedestals 201. For instance, peripheral restraining members 300' (as in FIG. 7b) could be secured to the top surfaces 222 of the support pedestals $201_1$ adjacent the parapet 400 in FIG. 1. As another example, interior restraining members 300, 300" may be secured to the top surfaces 222 of support pedestals $201_1$ (e.g., in the manner discussed in relation to FIGS. 4-5 and 11-12) in at least some of the rows of support pedestals. In one arrangement, pairs of restraining members 300 may be secured to every third row of support pedestals 201 as shown in FIGS. 1 and 8. Alternatively or additionally, a plurality of restraining members 300" may be respectively secured to adjacent pairs of support pedestals $201_1$ (e.g., as discussed previously in relation to FIGS. 11-13).

The method may then include mounting a plurality of surface tiles 102, 102" over the support pedestals 201 to create an elevated building surface 101. For instance, this step may include introducing first outer edge segments 120, 120" of a first portion of a plurality of surface tiles 102, 102" (e.g., rows of surface tiles 102, 102" to be directly restrained by a corresponding restraining member 300, 300', 300") between restraining and mounting elements 304/304'/304", 308/308'/308" of the restraining members (e.g., as in FIGS. 6, 7a, 7b and 11-13), and placing second outer edge segments 120, 120" (e.g., adjacent corner portions 116, 116") of the first portion of surface tiles over top surfaces 222 of a second portion of the plurality of support pedestals 201 (e.g., such as support pedestals $201_2$ in FIG. 8).

Figure 9:
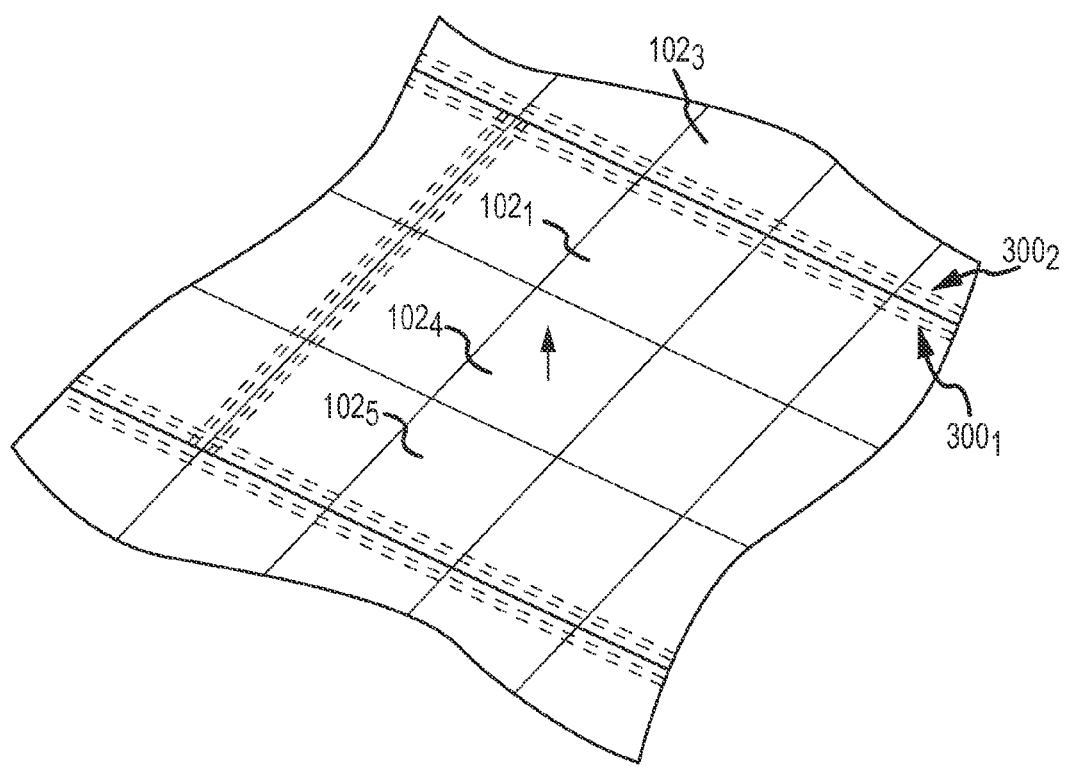
FIG. 9 is a perspective view similar to FIG. 8, but in another state of assembly.
Figure 10:
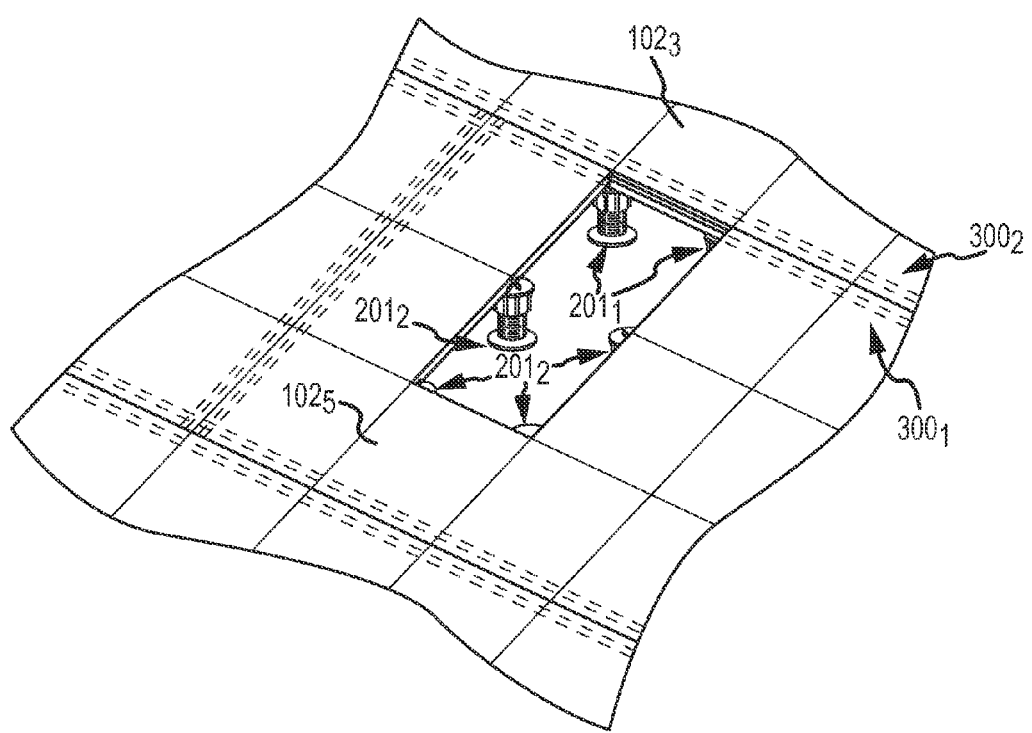
FIG. 10 is a perspective view similar to FIG. 9, but in another state of assembly.

As another example, outer edge segments 120 (e.g., adjacent corner portions 116) of a second portion of surface tiles (e.g., surface tiles that are not to be directly restrained by restraining members 300, 300', such as surface tile $102_4$ in FIGS. 8-9) may be placed over the top surfaces 222 of the second portion of support pedestals (e.g., support pedestals $201_2$) to create the elevated building surface 101. Advantageously, the surface tiles 102 in every third row of surface tiles (e.g., including surface tile $102_4$ in FIG. 8) may be removed from the elevated building surface assembly 100 to provide a user with access to a surface tile (e.g., such as surface tile $102_1$) that is being restrained by a restraining member 300, 300', 300" (e.g., so as to repair or replace the surface tile 102, a particular support pedestal 201, and/or the like). As discussed previously, any appropriate tie-down, anchoring washer arrangement, or the like may be disposed over or into support pedestals that are free of restraining members (e.g., support pedestals $201_2$) as appropriate to provide increased levels of resistance to wind, weather, and/or other environment events.

It is to be understood that the various components disclosed herein have not necessarily been drawn to scale. For instance, the restraining members 300, 300', 300" may actually be much thinner than depicted in the figures (e.g., in the event the restraining members 300, 300', 300" are constructed of sheet metal or other material or the like). Also, many components have been labeled as "first," "second," "third,", etc. (e.g., "first surface tile $102_1$," "second surface tile $102_2$," "third surface tile $102_3$," etc.) merely to assist the reader in understanding the relationships between the components should not imply that an elevated building surface assembly encompassed herein need have the specific arrangement shown and described herein. Furthermore, while small gaps have been shown between some of the components in the figures (e.g., between the bottom surfaces $112_1$, $112_3$ of the surface tiles $102_1$, $102_3$ and the top surfaces $309_1$, $309_3$ of the mounting elements $308_1$, $308_3$ of the restraining members $300_1$, $300_2$ in FIG. 7a), it is to be understood that in reality, these gaps may not exist and that such components may be in direct contact. In other words, at least some of such gaps have merely been provided to assist the reader in understanding the various components of the elevated building surface assembly 100.

The various restraining members disclosed herein may advantageously stiffen the elevated building surface assembly and thereby resist the effects of uplift forces and the like. Specifically, the interior restraining members may limit both buckling between adjacent surface tiles as well as limit the ability of the uplift forces to create force moments that may otherwise lift the surface tiles away from the support pedestals and away from other surface tiles (e.g., by changing the location on the lower surface of the surface tiles against which the uplift forces would need to be applied to move the surface tiles to a position that is less likely to result in lifting of the surface tiles). Also, the peripheral restraining members may restrain the outer periphery of the assembly to limit buckling between surface tiles adjacent the outer periphery. Furthermore, the disclosed elevated building surface assembly may not necessarily require any special modifications to the surface tiles in order to allow the restraining members to stiffen the assembly.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. For instance, while the drawings illustrate a symmetrical arrangement of rows and columns of square-shaped surface tiles 102, the present teachings may be readily applied to other arrangements and shapes of surface tiles 102, support pedestals 201, and/or the like. As another example, while the drawings illustrate restraining members 300, 300', 300" generally being secured to every third row of support pedestals 201, other arrangements are also envisioned and encompassed within the scope of the present disclosure. In one arrangement, at least some combination of interior restraining members may be secured to at least some rows and columns of support pedestals 201 depending upon the particular design requirements of the elevated building surface assembly 100.

As a further example, while the interior restraining members have been discussed in the context of pairs of interior restraining members (e.g., first and second restraining members $300_1$, $300_2$ in FIGS. 4-7a), some arrangements envision that a particular row or column of support pedestals may include only a single interior restraining member 300, 300". Still further, while the interior restraining members have been illustrated as being the restraining members 300, 300" and the peripheral restraining member have been shown as being the restraining members 300', it is envisioned that at least some of the peripheral restraining members could be in the form of restraining members 300 and/or at least some of the interior restraining members could be in the form of the restraining members 300'. Even further, while each of the restraining members 300, 300', 300" has been shown in the form of a generally C-shaped channel, other configurations are also possible. For instance, one or more of the restraining members 300, 300', 300" could be in the form of an H-shaped channel having opposing receiving spaces 316, 316, 316" that would allow for receipt of opposing surface tiles 102, 102".

While various embodiments of the present invention have been described in detail, it is apparent that modifications and adaptations of those embodiments will occur to those skilled in the art. However, is to be expressly understood that such modifications and adaptations are within the spirit and scope of the present invention.

What is claimed is:

1. An elevated building surface assembly, comprising:
   a plurality of surface tiles, the surface tiles comprising a top surface, a plurality of corner portions and outer edge segments disposed between adjacent corner portions;
   a plurality of support pedestals disposed in spaced-apart relation on a fixed surface, the support pedestals comprising a support plate having a top surface operatively supporting the surface tiles in horizontally spaced-apart relation; and
   a plurality of elongate restraining members, the restraining members comprising a restraining element and a mounting element that is spaced apart from the restraining element and operatively attached thereto, the restraining element being disposed proximate an outer edge segment of at least one of at least a pair of the plurality of surface tiles and along at least a portion of a length of the outer edge segments of at least one of the pair of surface tiles, and the mounting element being disposed adjacent the outer edge segments of at least one of the pair of surface tiles and affixed to the support plate of at least a first of the plurality of support pedestals to secure the at least one of the pair of surface tiles to the first support pedestal and restrict movement of the at least one of the pair of surface tiles in a direction away from the first support pedestal;
   wherein the plurality of elongate restraining members comprises a plurality of pairs of elongate restraining members, wherein the first elongate restraining member of each pair is configured to be disposed proximate an outer edge segment of the at least one of the pair of surface tiles disposed over the first support pedestal, and wherein the second elongate restraining member of each pair is configured to be disposed proximate an abutting outer edge segment of the other of the pair of surface tiles disposed over the first support pedestal; and
   wherein the restraining members further comprise a connection element interconnecting the restraining and mounting elements, and wherein the connection elements of the first and second elongate restraining members of each pair are abutting.

2. The elevated building surface assembly of claim 1, wherein the restraining element is disposed over the top surface of the pair of surface tiles.

3. The elevated building surface assembly of claim 2, wherein the plurality of surface tiles collectively comprise an elevated building surface having an outer periphery, and wherein the outer edge segments of the pair of surface tiles form a portion of the outer periphery.

4. The elevated building surface assembly of claim 1, wherein the restraining element is positioned within an opening disposed in the outer edge segment of at least one of the pair of surface tiles.

5. The elevated building surface assembly of claim 1, wherein the outer edge segments of the pair of surface tiles are collinear.

6. The elevated building surface assembly of claim 1, further comprising at least one of adhesive, a weld joint, ea spring-loaded locking member, or a fastener disposed between the mounting element and the top surface of the support plate of the first support pedestal to secure the restraining member to the first support pedestal.

7. The elevated building surface assembly of claim 1, wherein the pair of surface tiles comprises a first pair of surface tiles, wherein the restraining element of each of a first of the pairs of elongate restraining members is disposed proximate an outer edge segment of each of the first pair of surface tiles and along at least a portion of the length of the outer edge segments of the first pair of surface tiles, wherein the mounting element of each of the first pair of elongate restraining members is disposed adjacent the outer edge segments of the first pair of surface tiles and is affixed to the support plate of the first support pedestal to secure at least the first pair of surface tiles to the first support pedestal; and
   wherein the restraining element of each of a second of the pairs of elongate restraining members is disposed proximate an outer edge segment of each of a second pair of the plurality of surface tiles and along at least a portion of the length of the outer edge segments of the second pair of surface tiles, and wherein the mounting element of each of the second pair of elongate restraining members is disposed adjacent the outer edge segments of the second pair of surface tiles and is affixed to the support plate of one of the support pedestals to secure at least the second pair of surface tiles to the one of the support pedestals.

8. The elevated building surface assembly of claim 7, wherein the one of the support pedestals comprises the first support pedestal.

9. The elevated building surface assembly of claim 8, wherein the outer edge segments of the first pair of surface tiles abut the outer edge segments of the second pair of surface tiles.

10. The elevated building surface assembly of claim 1, wherein the top surfaces of the plurality of surface tiles collectively comprise an elevated building surface comprising an outer periphery, wherein the plurality of elongate restraining members comprise at least interior restraining members and peripheral restraining members, and wherein a plurality of the peripheral restraining members are disposed along at least a portion of the outer periphery of the elevated building surface.

* * * * *

UNITED STATES PATENT AND TRADEMARK OFFICE
CERTIFICATE OF CORRECTION

| | |
|---|---|
| PATENT NO. | : 9,038,324 B2 |
| APPLICATION NO. | : 13/777912 |
| DATED | : May 26, 2015 |
| INVENTOR(S) | : William E. Kugler et al. |

It is certified that error appears in the above-identified patent and that said Letters Patent is hereby corrected as shown below:

Claims

Column 18
Line 11, Claim 6 delete "joint, ea" and insert therefor --joint, a--.

Signed and Sealed this
Sixth Day of October, 2015

Michelle K. Lee
*Director of the United States Patent and Trademark Office*